(12) United States Patent
Martin et al.

(10) Patent No.: US 11,399,095 B2
(45) Date of Patent: Jul. 26, 2022

(54) APPARATUS AND METHOD FOR EMERGENCY DISPATCH

(71) Applicant: RapidSOS, Inc., New York, NY (US)

(72) Inventors: Michael John Martin, Long Island, NY (US); Nicholas Edward Horelik, Long Island City, NY (US); Riccardo Pellegrini, New York, NY (US)

(73) Assignee: RAPIDSOS, INC., New York, NY (US)

(*) Notice: Subject to any disclaimer, the term of this patent is extended or adjusted under 35 U.S.C. 154(b) by 0 days.

(21) Appl. No.: 16/812,995

(22) Filed: Mar. 9, 2020

(65) Prior Publication Data

US 2020/0288295 A1    Sep. 10, 2020

Related U.S. Application Data

(60) Provisional application No. 62/815,594, filed on Mar. 8, 2019.

(51) Int. Cl.
| | |
|---|---|
| *H04M 3/51* | (2006.01) |
| *H04W 4/90* | (2018.01) |
| *H04W 4/021* | (2018.01) |
| *H04W 4/029* | (2018.01) |
| *H04W 76/50* | (2018.01) |
| *G06N 20/00* | (2019.01) |
| *G06N 5/02* | (2006.01) |

(52) U.S. Cl.
CPC .......... *H04M 3/5116* (2013.01); *G06N 5/025* (2013.01); *G06N 20/00* (2019.01); *H04W 4/022* (2013.01); *H04W 4/029* (2018.02); *H04W 4/90* (2018.02); *H04W 76/50* (2018.02)

(58) Field of Classification Search
CPC ......... H04W 4/90; H04W 4/02; H04W 76/50; H04W 4/029; H04W 4/023; H04W 4/022; H04W 4/024; G06N 5/025; G06N 20/00; G06N 3/08; G06N 7/005; H04M 2242/04; H04M 3/5116; H04M 1/72418; H04L 67/12; H04L 67/18; G08B 25/005; G08B 25/006
See application file for complete search history.

(56) References Cited

U.S. PATENT DOCUMENTS 5,767,788 A * 6/1998 Ness ..................... B60R 25/102
340/5.61
9,426,638 B1 * 8/2016 Johnson .............. G08B 25/016
(Continued)

FOREIGN PATENT DOCUMENTS

CN          107220286 A *  9/2017

*Primary Examiner* — Matthew C Sams
(74) *Attorney, Agent, or Firm* — Cygan Law Offices P.C.; Joseph T. Cygan

(57) ABSTRACT

A disclosed method includes receiving data inputs for a plurality of events including alarms, sensors, and mobile device emergency call and emergency alert related emergency data; determining event correlations based on the data inputs to generate a set of correlated events; determining emergency network dispatch rules for each correlated event based on event type; applying corresponding emergency network dispatch rules to each corresponding correlated event; and sending a dispatch recommendation to an emergency network entity for each correlated event based on application of the corresponding emergency network dispatch rules.

16 Claims, 15 Drawing Sheets

(56) References Cited

U.S. PATENT DOCUMENTS

| | | | |
|---|---|---|---|
| 10,595,183 B2* | 3/2020 | MacGabann | G06Q 10/06316 |
| 2009/0132662 A1* | 5/2009 | Sheridan | H04L 51/26 |
| | | | 709/206 |
| 2010/0100510 A1* | 4/2010 | Balaban | G06N 7/08 |
| | | | 706/12 |
| 2015/0092928 A1* | 4/2015 | Jensen | G16H 10/60 |
| | | | 379/45 |
| 2015/0213369 A1* | 7/2015 | Brandt | G06N 20/00 |
| | | | 706/12 |
| 2015/0248299 A1* | 9/2015 | Rasband | G01S 5/0236 |
| | | | 713/2 |
| 2017/0161614 A1* | 6/2017 | Mehta | G06N 20/00 |
| 2017/0169699 A1* | 6/2017 | Will | G08B 21/0461 |
| 2017/0325056 A1* | 11/2017 | Mehta | H04M 11/04 |
| 2018/0053401 A1* | 2/2018 | Martin | H04W 4/90 |
| 2018/0150750 A1* | 5/2018 | Verdejo | G06K 9/00771 |
| 2018/0174430 A1* | 6/2018 | Sieja | G08B 21/0453 |
| 2018/0288224 A1* | 10/2018 | Dizengof | H04W 4/38 |
| 2018/0301017 A1* | 10/2018 | Dizengof | H04W 4/90 |
| 2019/0082312 A1* | 3/2019 | Neybert | G06Q 50/265 |
| 2019/0313230 A1* | 10/2019 | MacGabann | H04L 67/28 |
| 2019/0378397 A1* | 12/2019 | Williams II | G06N 20/00 |
| 2020/0288011 A1* | 9/2020 | Petty | H04M 3/436 |
| 2020/0288295 A1* | 9/2020 | Martin | G06N 5/025 |
| 2020/0388144 A1* | 12/2020 | Williams, II | G06N 3/006 |

* cited by examiner

FIG. 9

APPARATUS AND METHOD FOR EMERGENCY DISPATCH

CROSS-REFERENCE TO RELATED APPLICATIONS

The present application claims priority to U.S. Provisional Patent Application No. 62/815,594, filed Mar. 8, 2019, entitled "SENSOR-ENABLED TRIAGE AND AUTOMATED EMERGENCY RESPONSE" which is hereby incorporated by reference herein in its entirety, and which is assigned to the same assignee as the present application.

FIELD OF THE DISCLOSURE

The present disclosure relates generally to emergency calls, enhanced 9-1-1 (E911) and next generation 9-1-1 (NG911) emergency networks, and more particularly, to acquisition of emergency event data for use in responding to emergencies.

BACKGROUND

Emergency networks which may also be referred to as emergency dispatch centers (EDC) including public safety answering points (PSAPs), utilize various enhanced 9-1-1 (E911) or next generation 9-1-1 (NG911) emergency network infrastructures which provide interconnection to the Internet protocol (IP) domain.

An emergency network refers to an entity that may receive an emergency call or an emergency alert and coordinate emergency assistance. An emergency network may be owned and operated by a public organization run by a municipality, county or city, or by a private organization such as a corporation or college campus. Emergency assistance provided can include medical, caregivers, firefighting, police, military, paramilitary, border patrol, lifeguard, security services, or any combination thereof. These personnel may be referred to as "Emergency Service Providers" (ESPs) or "emergency responders," or "responders." In existing systems ESPs or responders are dispatched by dispatch operators who communicate with responders via radio dispatch systems.

BRIEF DESCRIPTION OF THE DRAWINGS

FIG. 9 is another example graphical user interface (GUI) displayed on an emergency network entity display in accordance with an embodiment.

DETAILED DESCRIPTION

Figure 1:
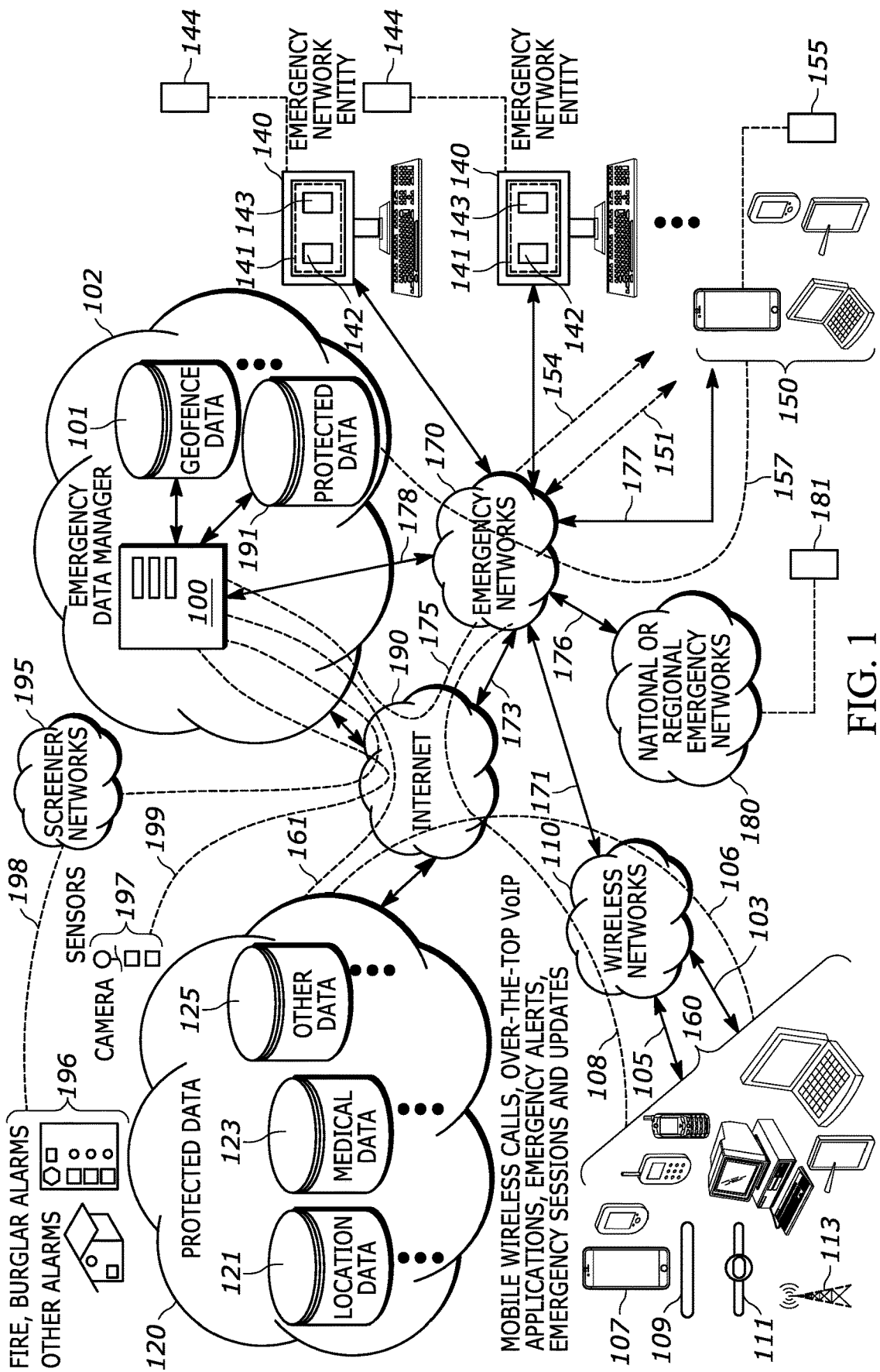
FIG. 1 is a diagram illustrating an emergency data manager in communication with various emergency networks, mobile devices, alarms and sensors.

Briefly, the present disclosure provides apparatuses and methods of correlating events received that are related to emergency situations, and providing automated emergency dispatch capabilities based on event correlation and application of emergency network dispatch rules.

One disclosed method includes receiving data inputs for a plurality of events including alarms, sensors, and mobile device emergency call and emergency alert related emergency data; determining event correlations based on the data inputs to generate a set of correlated events; determining emergency network dispatch rules for each correlated event based on event type; applying corresponding emergency network dispatch rules to each corresponding correlated event; and sending a dispatch recommendation to an emergency network entity for each correlated event based on application of the corresponding emergency network dispatch rules. The method may further include dispatching emergency responders automatically by sending the dispatch recommendation to emergency responders corresponding to the emergency type for each correlated event.

The method may further include determining the emergency network entity for each correlated event based on associations between the data inputs corresponding to each correlated event and the emergency network entity's geographic boundary. The method may further include determining event correlations based on the data inputs to generate a set of correlated events by determining event correlations via a logic component trained using machine learning. In some implementations the method may apply corresponding emergency network dispatch rules to each corresponding correlated event by determining answers to a series of questions corresponding to the event type via a logic component trained using machine learning. The method may further include establishing a plurality of network connections with a plurality of emergency network entities; and sending dispatch recommendations to each emergency network entity based on the associations between the data inputs corresponding to each correlated event and with each emergency network entity's geographic boundary. In some implementations the method may determine emergency network dispatch rules for each correlated event based on event type, by determining an event type for each correlated event as an event type selected from the group of: a fire emergency event, a police emergency event and a medical emergency event. Further, in some implementations the method may include determining emergency network dispatch rules for each correlated event based on event type, by determining that a correlated event includes a combination of at least two event types selected from the group of: a fire emergency event, a police emergency event and a medical emergency event.

The method may further includes sending a first dispatch recommendation related to a first event type to an emergency network entity for a correlated event; and sending a second dispatch recommendation related to a second event type for the correlated event. Sending a second dispatch recommendation related to a second event type for the correlated event may include sending the second dispatch recommendation related to the second event type to a second emergency network entity.

A disclosed apparatus includes: a network component, operative to connect to the Internet; and event correlation logic, operatively coupled to the network component. The event correlation logic is operative to: receive data inputs for a plurality of events including alarms, sensors, and mobile device emergency call and emergency alert related emergency data; determine event correlations based on the data inputs to generate a set of correlated events; determine emergency network dispatch rules for each correlated event based on event type; apply corresponding emergency network dispatch rules to each corresponding correlated event; and send a dispatch recommendation to an emergency network entity for each correlated event based on application of the corresponding emergency network dispatch rules. The event correlation logic may be further operative to dispatch emergency responders automatically by sending the dispatch recommendation to emergency responders corresponding to the emergency type for each correlated event.

The apparatus may further include a geofence module, operatively coupled to the event correlation logic. The geofence module is operative to determine the emergency network entity for each correlated event based on associations between the data inputs corresponding to each correlated event and the emergency network entity's geographic boundary. In some implementations, the event correlation logic is trained to determine event correlations using machine learning. In some implementations the event correlation logic is trained to apply corresponding emergency network dispatch rules to each corresponding correlated event, by determining answers to a series of questions corresponding to the event type using machine learning.

The event correlation logic may be further operative to: establish a plurality of network connections with a plurality of emergency network entities; and send dispatch recommendations to each emergency network entity based on the associations between the data inputs corresponding to each correlated event and with each emergency network entity's geographic boundary. In some implementations, the event correlation logic is operative to determine emergency network dispatch rules for each correlated event based on event type, by determining an event type for each correlated event as an event type selected from the group of: a fire emergency event, a police emergency event and a medical emergency event. In some implementations, the event correlation logic is operative to determine emergency network dispatch rules for each correlated event based on event type, by determining that a correlated event includes a combination of at least two event types selected from the group of: a fire emergency event, a police emergency event and a medical emergency event.

The event correlation logic may be further operative to send a first dispatch recommendation related to a first event type to an emergency network entity for a correlated event; and send a second dispatch recommendation related to a second event type for the correlated event. The event correlation logic may be operative to send a second dispatch recommendation related to a second event type for the correlated event, by sending the second dispatch recommendation related to the second event type to a second emergency network entity.

Turning now to the drawings wherein like numerals represent like components, FIG. 1 illustrates an emergency data manager 100 which is operative to communicate with various emergency networks 170 including, but not limited to, multiple Enhanced 9-1-1 (E911) or Next Generation 9-1-1 (NG911) emergency networks 170, via network connections 175. E911 and NG911 emergency networks are defined according to the National Emergency Number Association (NENA) standards which define applicable network architectures and protocols for communication between various network entities within the network architectures. Emergency networks are owned and operated by various emergency service providers (ESPs) such as, but not limited to, municipalities, state governments, and other public safety services (PSS) as well as private emergency service providers such as corporate security, college campus security, etc. The emergency services provided are for example, police, fire department, ambulance, etc. One type of emergency network is a public safety answering point (PSAP), which may handle emergency calls for police, fire and medical emergencies. Put another way, an ESP is an organization that owns and operates an emergency network where the emergency network includes the infrastructure, network entities, communication devices and other equipment required to provide the emergency services.

In FIG. 1, double arrowed lines represent operative coupling which may be implemented as backhaul connections between network entities, or as wireless connections between network entities and devices. Curved, dotted lines in FIG. 1 represent network connections or data connections over which data may be sent and received by respective devices, network entities or by combinations of devices and network entities sending data to, and receiving data from, each other, accordingly. The network connections may be Internet connections and may further include Virtual Private Network (VPN) pathways or other secure connections. The emergency data manager 100 is operatively coupled to emergency networks 170 via operative coupling 178, which may be implemented as network connections 175 through the Internet 190. The network connections 175 may include an Internet protocol (IP) connection between each of the emergency networks 170 and the emergency data manager 100 and may be connection oriented or connectionless. For example, the network connections 175 may include IP connections which may include a TCP (Transmission Control Protocol, also referred to as Transport Control Protocol) connection, a UDP (User Datagram Protocol) connection or a combination of both such as UDP over TCP, etc., or a combination of TCP and UDP connections, etc. An IP connection may further employ one or more TCP sockets or one or more WebSocket connections. The emergency networks may have backhaul connections 173 to the Internet 190 and backhaul connections 176 to national or regional emergency networks 180.

The emergency data manager 100 is also operatively coupled to various alarms 196 such as, but not limited to, burglar alarms, fire alarms, carbon monoxide alarms, water level alarms etc., and to various sensors 197 such as, but not limited to video cameras, motion detectors, audio sensors, glass break detectors, heat sensors, water level sensors, and automobile sensors such as airbag deployment sensors, collision sensors, gyroscopes and inertia detectors, etc. Some automobile sensors may be considered alarms. The various alarms 196 may be operatively coupled to screener networks 195 that receive the alarm data 198 outputs and perform alarm validation and scoring procedures. The screener networks 195 are operatively coupled to the emergency data manager 100 via an Internet connection. The various sensors 197 may also provide sensor data 199 to the emergency data manager 100 via the Internet using an appropriate connectivity networks such as wireless networks 110 or via some other means of Internet 190 connection.

The emergency data manager 100 may operate as an interface between the emergency networks 170, databases 120 and devices 160, to provide emergency data to the emergency networks 170. The emergency data manager 100 is operative to retrieve various types of emergency data such as location data, medical data, sensor data, camera data and other data, etc., determine the appropriate emergency network 170 authorized to receive specific emergency data, and provide that specific emergency data to the authorized emergency network. The emergency data manager 100 may, under some circumstances and for certain types of emergency data, store obtained emergency data in one or more databases which may be distributed databases. Protected data may be stored in protected data database 191 that may contain data that is subject to laws, regulations or policies that define how the data is accessed and handled. Among other things, the emergency data manager 100 is operative to obtain mobile device location data in response to a mobile device initiating an emergency call 103 or sending an emergency alert 105.

The emergency data manager 100 may communicate with, and retrieve and obtain data from, any of the various databases 120, any of which may contain protected data, and may also receive and store emergency data from the devices 160. The emergency data manager 100 is operative to determine the authorized emergency network using a geofence database 101 which includes boundary information for all of the emergency networks 170 and also for national or regional emergency networks 180.

The various emergency networks 170 may include various public safety answering points (PSAPs) which may answer emergency calls and accordingly dispatch police, fire departments and ambulances. Each emergency network such as, but not limited to a PSAP, may include an emergency dispatch center and employ a computer aided dispatch (CAD) system. Each emergency network 170 includes various emergency network entities such as at least one emergency network entity 140 which may be a workstation implementing a CAD system, a call handling system etc., and which provides various graphical user interfaces (GUIs) on a display 141 for use by emergency network personnel. The term "emergency network entity" refers to a hardware apparatus used to access or implement an emergency network such as, but not limited to, workstations, servers, routers, switches, laptops, desktop computers, etc. An emergency network entity hardware apparatus may include software or firmware related to its emergency network function.

Each individual emergency network 170 may include an emergency call handling system which is operatively coupled to a PSTN (public switched telephone network) and various wireless networks 110 via appropriate backhaul connections and call routing 171. The various emergency networks 170 are each operative to receive emergency calls 103 from a variety of devices 160 and a variety of device types. Each individual emergency network 170 may also receive emergency alerts 105 and establish emergency sessions 108 from the various devices 160 over the Internet 190. An emergency alert 105 may be sent as, for example, short message service (SMS) messages, SMS data messages, instant messages (IM), multi-media messages (MMS), email, or other formats of messages sent as Internet Protocol (IP) messages. For example, IP based messages may be sent using TCP, UDP, SIP, HTTP, or other mechanisms, etc. Emergency sessions 108 may also be established using these same, or other, IP protocols. An emergency session 108 refers to communication over an Internet connection between any the various types of devices 160 and an emergency network, where there is communication between one of the devices 160 and a particular emergency network of the emergency networks 170. The communication may be bi-directional. One example of a bi-directional emergency session 108 is a Voice-over-IP (VoIP) call using Session Initiation Protocol (SIP). Another example is an IP call using H.323 protocol, or some other communication protocol, etc. An emergency alert 105 may be, but is not limited to, data sent from a device 160 to a given one of the emergency networks 170. Because the emergency alert 105 will contain information that identifies the specific device 160 that sent the alert, the specific emergency network that received the emergency alert 105 may be able to respond to the device 160 by sending a response or acknowledgement message, or by making a call-back if the device 160 is for example, a mobile telephone such as a smartphone 107. The information that identifies a specific device 160 is referred to herein as a "device identifier." That is, a "device identifier" refers to information allowing identification of the device or a user of the device, such as for example, a phone number associated with a user, an email address, physical address, coordinates, IMEI number, IMSI, TMSI, IP address, BSSID, SSID or MAC address.

The various types of devices 160 that may communicate with an emergency network include, but are not limited to, desktop computers, laptop computers, tablets, mobile phones, smartphones 107, smartwatches 111 (or other health and medical tracking devices), medical bracelets 109, and various wired devices which may be Internet-of-Things (IoT) devices 113 which are operative to send and receive data from a wireless network such as, but not limited to, a 5th generation mobile network (5G network). A medical bracelet 109 may be a type of IoT device and may be operative to transmit an emergency alert 105 to an emergency network. Emergency calls may also be made from landline phones connected to a PSTN and medical bracelet 109 and/or health monitoring device, such as a medical bracelet 109, may use a wireless access point connected to the PSTN to place an emergency call 103 or send emergency alert 105. Some medical devices, which may be implanted in the human body or connected with the human body such as, but not limited to, a pacemaker, an insulin pump, etc., may also be operative to send emergency alerts 105.

An "emergency alert" refers to a communication relating to an emergency or non-emergency situation. That is, an emergency alert may be an emergency request for assistance where the emergency alert is associated with an emergency situation. An emergency alert may include information related to a device, the device user, past and current location, or an indication of the type of emergency such as, but not limited to, police, fire, medical, CO level, traffic accident or some other information in various combinations. An emergency alert may be associated with a non-emergency situation such as a request for a tow truck after a car breaks down. In other words, a situation that requires assistance, but is not necessarily a life-or-death critical situation. Emergency alerts may be associated with a device that sent the alert, or may be associated with a device not sending the alert such as a device making a proxy request on behalf of a second device or a member device in a group of devices, etc. An emergency alert may be "associated" with a device or user when the emergency alert relates to an emergency or non-emergency situation involving the device or user. Emergency alerts may include pointers to other sources of information such as, but not limited to, medical records and health data for the device user, or for another device user in a proxy situation, etc.

In one example of operation, an emergency alert 105 may be triggered by a device 160 in any of various ways such as, but not limited to, device fall detection, by the user pressing a soft button or a physical button (i.e. a "panic button"), a voice command, a gesture, or autonomously based on other sensor data such as via a smoke, carbon-monoxide, burglar alarm, or some other alarm, etc. In some situations, the user may confirm the emergency or provide authorization for sending the emergency alert 105.

Emergency data, such as enhanced location data, medical data, or other data, may be sent by the devices 160 to the various databases 120 and pushed to the emergency data manager 100 as part of the emergency alert 105. The emergency data may be sent from the devices 160 as updates 106 to a specific database of the various databases 120. The data updates 106 may be pushed to the emergency data manager 100 based on a subscription of a particular device 160 to the emergency data manager 100 services, or when a device 160 initiates an emergency session 108. In either case, the emergency data manager 100 may store the data in the protected data database 191 for a period of time in anticipation of an emergency data request from one of the emergency networks 170. The emergency data manager 100 is operative to provide emergency data in the protected data database 191, or access and provide emergency data in the databases 120 in response to an emergency data request. An emergency network 170 or an emergency responder device 150 may send an emergency data request to the emergency data manager 100.

Each of the devices 160 may be operative to send data updates 106 from time-to-time, or based on a schedule, to various databases 120 and this data may subsequently be used as information included in emergency alerts 105. The databases 120 may contain protected data in that the data is subject to various statutorily defined protections, such as, but not limited to, HIPPA, GDPR, or other statutorily defined data protection and data privacy requirements. The databases 120 may include location databases 121, medical databases 123 and other databases 125 with various personally identifiable data related to device 160 users. The data contained in the databases 120 is referred to as "emergency data" in that it may be retrieved by the emergency data manager 100, via an IP connection 161, in response to a detected emergency detected by the emergency data manager 100 or in response to an emergency data request.

Each emergency network 170 has at least one emergency network entity 140 that includes one or more processors that are operative to execute one or more emergency services related applications, a display 141 and emergency response logic 144 in accordance with the various embodiments. In some embodiments, the emergency response logic 144 may be implemented as an application executed by the one or more processors of the emergency network entity 140. The emergency response logic 144 is operative to provide a graphical user interface (GUI) 143 on the workstation display 141. During operation, the emergency network entity 140 may also display other GUIs such as GUI 142, which may be related to, and provided by, other emergency response applications such as, but not limited to, an emergency call handling application or a computer aided dispatch (CAD) application.

The emergency response logic 144 is operative to communicate with the emergency data manager 100. The emergency data manager 100 may be included within an emergency data management network 102 which may include one or more servers, and one or more databases such as geofence database 101 and protected data database 191. The emergency data manager 100 may be implemented as a server having at least one processor, or may be implemented as a distributed system with multiple servers, processors, memory and databases, and may further provide cloud-based, software-as-a-service (SaaS) features and functions and/or may be implemented as SaaS using a platform-as-a-service (PaaS).

The GUI 143, in conjunction with the emergency response logic 144, are operative to retrieve and display emergency data provided by the emergency data manager 100. More particularly, the GUI 143 provides communication between an emergency network entity such as the emergency network entity 140, and the emergency data manager 100. The GUI 143 may be implemented as a web browser interface, such as a cloud-based application interface (i.e. a software-as-a-service SaaS interface), or via a web browser plug-in, or may be associated with an application running as executable instructions, executed by one or more processors on the emergency network entity 140, or by any other software implementation mechanism. Emergency services personnel may receive appropriate emergency services information and view emergency data via the GUI 143.

Depending on the specific operations of the emergency network and the particular type of emergency network entity 140 software, the GUI 142 may be used by emergency services personnel to place dispatch calls to emergency responders, who receive the dispatch calls and emergency data on various emergency responder devices 150 accordingly. Emergency responders, also referred to as emergency service providers (ESPs) may utilize a variety of emergency responder devices 150 which may include, but are not limited to, desktop computers, laptop computers, tablets, mobile phones, smartphones, radios (i.e. walkie-talkies), in-vehicle computers, etc., all of which are operative to display emergency data to the emergency responders. The devices 150 may be operative to send emergency data requests 151 to a respective emergency network 170 and also authentication data 153. The devices 150 communicate with the emergency networks 170 over a combination of wireless networks 110 and proprietary wireless networks that provide wireless communications links 177. Each of the devices 150 may include a mobile emergency data application, that provides a GUI 155 and that is operative to communicate with the emergency response logic 144 and the emergency data manager 100. In response to emergency data requests 151, the emergency data manager 100 is operative to provide limited access to emergency data 157 to the emergency responder devices 150 based on the authorization level of the specific emergency responder device 150 and associated user.

An emergency data request 151 from an emergency responder device 150, may be sent either by a responder device 150, or by an appropriate one of the emergency networks 170, to the emergency data manager 100 such that the emergency data manager 100 may identify the emergency and any emergency data pertaining to the emergency stored by the emergency data manager 100 or contained within the various databases 120. In response, the emergency data manager 100, may check authorization, and then proceed to send the pertinent emergency data 157 to the requesting emergency responder device 150. In other words, in some implementations, the emergency data manager 100 may serve as a data pipeline for emergency responder devices 150 through which the emergency responder devices 150 may request and retrieve reliable emergency data through secure pathways using defined protocols and formats. The emergency data may be, but is not limited to: accurate location data, that is critical for responding to an emergency, medical data, sensor data, or other data, etc. The emergency data manager 100 is operative to obtain emergency data from various sources including other servers, databases 120, devices 160, alarms 196 and sensors 197.

In one example of operation, an emergency alert 105 may be triggered by a device 160 in any of various ways such as, but not limited to, device fall detection, by the user pressing a soft button or a physical button (i.e. a "panic button"), a voice command, a gesture, or autonomously based on alarm 196 data or sensor 197 data such via a smoke, carbon-monoxide, burglar alarm, or some other alarm, motion detector, camera, etc. In some situations, the user may confirm the emergency or provide authorization for sending the emergency alert 105. In one example, an alarm data 198 from a burglar of fire alarm may be sent to one of various screener networks 195. Screener network personnel may place a call to a keyholder and request further validation. If the alarm is validated by the keyholder, the screener network personnel may assign a priority score to the alarm and send it as a prioritized alarm to the emergency data manager 100. Some alarm data 198 that does not first pass through one of the screener networks 195 is received by the emergency data manager 100 as unprioritized alarm data. The emergency data manager 100 is operative to perform alarm verification and scoring procedures to determine whether the alarm data should be pushed to one of the emergency networks 170.

Emergency data, such as enhanced location data, medical data, or other data, may be sent by a device 160 to an appropriate one of the emergency networks 170 as part of an emergency alert 105, or may be sent as data updates 106 to a specific database of the various databases 120. In some implementations, and/or for certain types of emergency data, the emergency data manager 100 may push emergency data to a given emergency network 170 as that emergency data is obtained by the emergency data manager 100. An emergency network 170 may also, at any time, send an emergency data request to the emergency data manager 100 such that the emergency data manager 100 may search or query the various databases 120. In some implementations, an emergency data search may be performed by the emergency data manager 100, using the IP connections 161 to the various databases 120, in response to an emergency alert 105, emergency call 103, or emergency session 108 between a device 160 and one of the emergency networks 170. In one example, the emergency data manager 100 is operative to receive Android™ Emergency Location Service (ELS) or Advance Mobile Location (AML) data upon initiation of an emergency call 103, emergency alert 105, or emergency session 108 by a device 160 that utilizes the Android™ operating system. Upon receipt of ELS or AML data, the emergency data manager 100 is operative to push the ELS or AML data to the appropriate emergency network 170 based on a geofence analysis using the geofence database 101. The emergency data manager 100 may also perform a search of the various databases 120 using a device identifier in the ELS or AML data to identify additional related emergency data and push that emergency data to the appropriate emergency network 170.

The emergency data manager 100 or the emergency network 170 may format stored emergency data or any received emergency data into a format that is compatible with industry standards for storing and sharing emergency data. For example, the emergency data may be formatted to be compatible with National Emergency Number Association (NENA) standards. Where emergency data is stored by the emergency data manager 100, emergency data requests may be sent to the emergency data manager 100 by an emergency network, such as via an HTTP GET request. For example, protected data may be stored in the protected data database 191 pending receipt of appropriate authorization credential by the emergency data manager 100. In other words, some emergency data may be pushed to emergency networks 170 upon receipt by the emergency data manager 100, while other data, if subject to the categorization of protected data, may only be sent upon receipt of proper authorization and/or in conjunction with an authorized emergency data request.

Emergency data requests 151, whether sent directly by a responder device 150 or via an emergency network 170 may utilize Location Information Server (LIS) protocol. For emergency data related to location, the data may include, but is not limited to, device generated location data (such as device 160 GPS chipset data), location information such as Location-by-Reference, Location-by-Value, etc. from, for example a, Location Information Server (LIS) or from other sources. Such location data that contains multiple location determination method data is referred to as hybrid location data.

Each of the emergency networks 170 may be operatively coupled, via appropriate backhaul connections 176, to one or more national or regional emergency networks 180. The national or regional networks 180 each include an emergency event application 181 which is operative to, among other things, display emergency events for a hierarchical view of emergencies being handled by one or more of the emergency networks 170.

Figure 2:
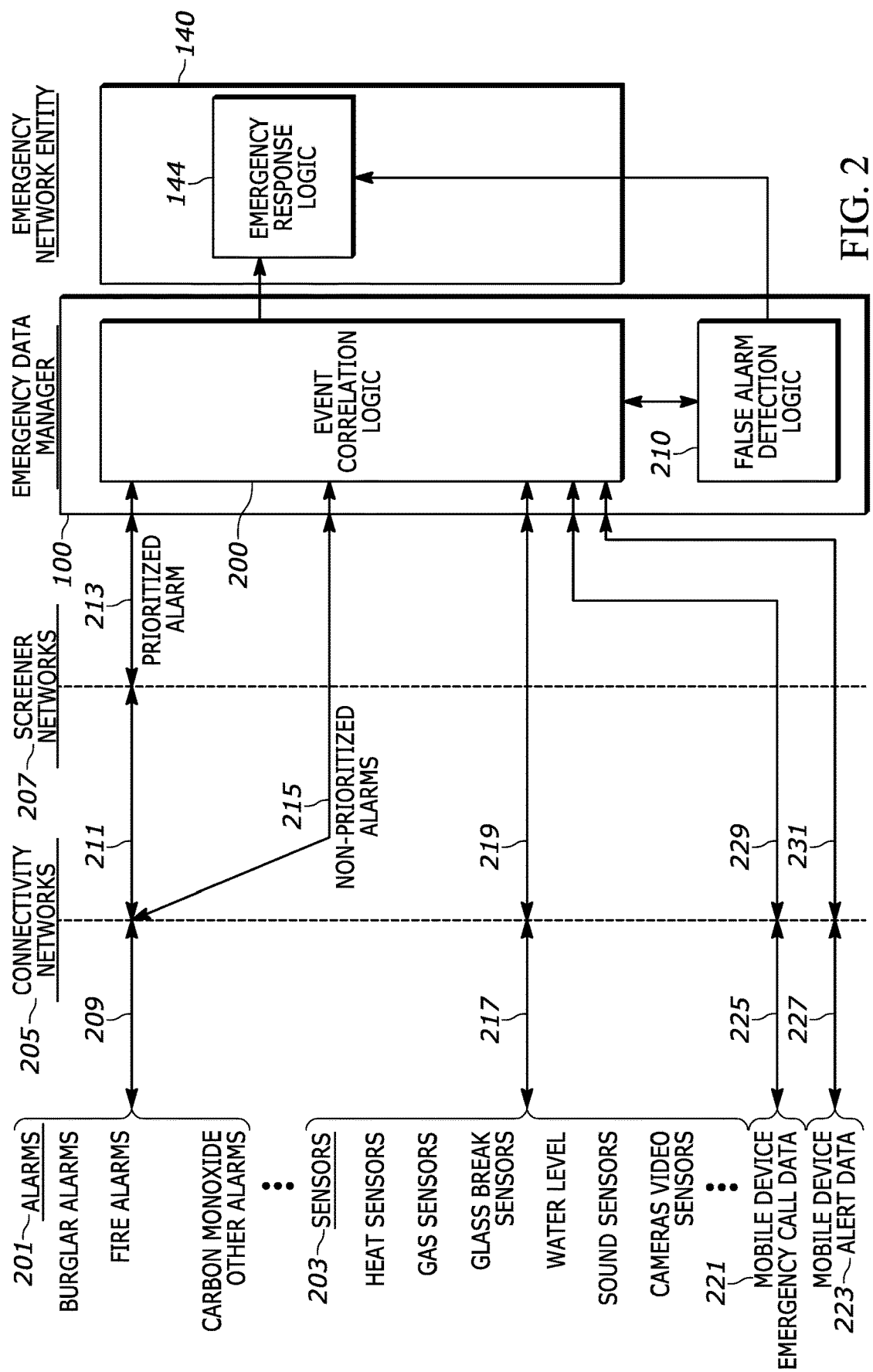
FIG. 2 is a block diagram of showing further details of an emergency data manager having event correlation logic and false alarm detection logic in accordance with various embodiments.

FIG. 2 provides further details of the emergency data manager 100. The emergency data manager 100 includes event correlation logic 200 which is operatively coupled to false alarm detection logic 210. The emergency data manager 100 is also operatively coupled to emergency response logic 144, which is within an emergency network entity 140 of an emergency network. The event correlation logic 200 is operative to receive prioritized alarm data 213 from various screener networks 207, and non-prioritized alarm data 215 from various alarms 201 via various connectivity networks 205. The alarms 201 are operatively coupled to the connectivity networks 205 via various connections 209 which may include wired or wireless connections. The connectivity networks 205 include the wireless networks 110 and the Internet 190. The screener networks 207 are operatively coupled to various alarms 201 via the connectivity networks 205 and receive alarm data 211 which includes identification information such as an alarm identifier, and address or other information.

Various sensors 203 are also operatively coupled to the connectivity networks 205 via various connections 217 which may include wired connections or wireless connections. The sensors 203 are operative to send sensor data 219 to the event correlation logic 200 via the various connectivity networks 205 which may include the Internet 190. The event correlation logic 200 also receives mobile device emergency call data 229 from various mobile devices 221, and mobile device alert data 231 from the same or other mobile devices 223. The mobile devices 221 communicate wirelessly by wireless connections 225 with the various connectivity networks 205. Likewise, mobile devices send alert data over connections 227 which may be Internet connections implemented using the same wireless connections.

The event correlation logic 200 is operative to perform correlation operations on all data which it receives from the various sources. The correlation operations are based on machine learning and data collection and analysis by machine learning algorithms performed over a period of time. The event correlation logic 200 is operative to receive input data and evaluate whether it is related to other input data received during a given time interval. For example, if mobile device emergency call data 229 is received, the event correlation logic 200 will evaluate whether any prioritized alarm data 213, non-prioritized alarm data 215, sensor data 219 or mobile device alert data 231 is in any way related to the emergency call data 229. Any correlation determinations that are made by the event correlation logic 200 are conveyed to the emergency response logic 144 to enhance the emergency network response to the situation.

The event correlation logic 200 also provides an input to false alarm detection logic 210. The false alarm detection logic 210 is operative to analyze correlated events involving non-prioritized alarm data 215 to determine whether an actual alarm condition exists, or whether a false alarm condition has been generated. The false alarm detection logic 210 is operative to report on alarm conditions to the emergency response logic 144 such that emergency network personnel operating the emergency network entity 140 can appropriately respond to alarms and more particularly, to avoid dispatching emergency service personnel based on false alarm conditions.

The event correlation logic 200 is able to evaluate non-prioritized alarm data 215 based on a variety of factors including proximity. For example, if non-prioritized alarm data 215 is received, sensor data 219 may be received that is related to sensors 203 that are in a physical proximity to the alarms 201 that generated the non-prioritized alarm data 215. Additionally, mobile device emergency call data 229 may have also been received from mobile devices that are in a location nearby the location from which the non-prioritized alarm data 215 was generated. In addition to location, the time of receipt of data is also used by the event correlation logic 200 to make event correlation determinations.

The false alarm detection logic 210 evaluates correlated event data based on additional criteria such as whether prioritized alarm data 215 and sensor data 219 have additional relationships useful for indicating that an alarm is legitimate. For example, if non-prioritized alarm data 215 is received from a burglar alarm, in conjunction with sensor data 219 from glass break sensors that are located in the same building as the burglar alarm, this information may be used to determine that the burglar alarm is an actual alarm rather than a false alarm. Additional sensor data 219 may also be such as, but not limited to, sound sensor data, camera video sensor data, motion detector data, etc. The false alarm detection logic 210 is operative to assign a score to non-prioritized alarm data 215 and convey the non-prioritized alarm data 215 along with the score to the emergency response logic 144 where emergency personnel may respond accordingly.

Both the event correlation logic 200 and false alarm detection logic 210 are also operative to perform automated dispatch operations using the emergency response logic 144, based on threshold levels agreed upon by the particular emergency network responding to the emergency event. More particularly, in some embodiments, the event correlation logic 200 is operative to perform a dispatch analysis on correlated events to determine whether or not emergency service personnel should be dispatched to the scene of a correlated event. The event correlation logic 200 may also receive input back from the false alarm detection logic 210 such that a correlated event that has a non-false alarm indication is subjected to the automated dispatch analysis prior to interacting with the emergency response logic 144.

Figure 3:
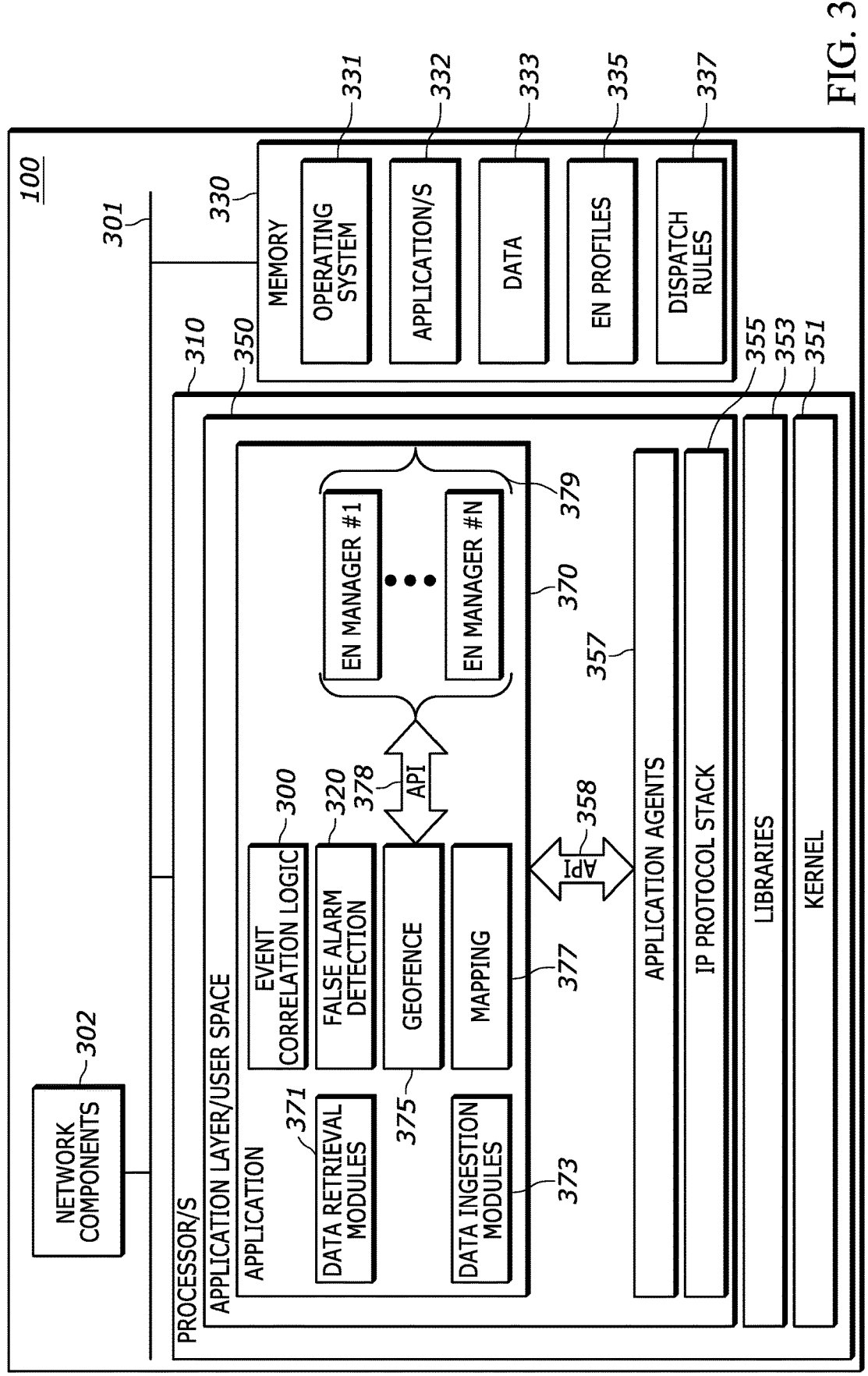
FIG. 3 is a diagram providing further details of an emergency data manager in accordance with one embodiment.

FIG. 3 provides an example implementation of the emergency data manager 100 which is an apparatus shown in FIG. 1 and FIG. 2. The emergency data manager 100 includes network components 302, at least one processor 310, and at least one non-volatile, non-transitory memory 330 in addition to RAM (random access memory). The at least one processor 310 is an emergency data management processor and is another type of apparatus disclosed herein. The network components 302 may include one or more network transceivers for Ethernet connectivity to other network entities and an Internet connection. The memory 330 stores executable instructions and data such as operating system 331 executable instructions and various application executable instructions 332. The operating system 331 executable instructions and the application executable instructions 332 may be executed by the at least one processor 310.

The memory 330 also stores data 333 which may provide a location and geofence data cache, other data caches and other data, etc., emergency network profiles 335 which provide login credentials, settings and other data related to emergency networks that access the emergency data manager 100, and dispatch rules 337.

The processor 310 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 310 is configured and operative to fetch and execute computer-readable instructions (i.e. executable instructions) stored in the memory 330. For example, the operating system 331 executable instructions, when executed by the at least one processor 310, may provide a kernel 351, libraries 353 (i.e. application programming interfaces or "APIs"), an application layer 350 or "user space" within which the various applications are executed, and an IP protocol stack 355. The applications executable instructions 332, when executed by the at least one processor 310, also provide data retrieval modules 371, data ingestion modules 373, a geofence module 375, a mapping module 377, and one or more emergency network managers 379. Emergency network profiles 335, stored in memory 330, may be accessed by the various modules and the emergency network managers 379 to access information needed to communicate with various emergency networks. The emergency network managers 379 communicate with the other modules of application 370 via a set of APIs 378. The processor 310 may further execute a set of application agents 357 which facilitate communication between the IP protocol stack 355 and the application 370 via various APIs 358. The application agents 357 are operative to, among other things, provide API communication between the various applications and the kernel 351.

In accordance with an embodiment, the emergency data manager 100 includes event correlation logic 300 and false alarm detection logic 320 that may each be implemented as applications executed by the at least one processor 310. The event correlation logic 300 and false alarm detection logic 320 perform operations as described with respect to FIG. 2. In some embodiments, either or both of the event correlation logic 300 and the false alarm detection logic 320 may be implemented using ASICs, FPGAs, DSPs, or combinations thereof. For example, the event correlation logic 300 may be implemented as an ASIC and the false alarm detection logic 320 may be implemented as an ASIC that are operatively coupled to each other and to the at least one processor 310.

The emergency data manager 100 may be implemented as a cloud server. The term "cloud server" as used herein, refers to a server, accessible by an Internet connection, that is operative to host one or more applications that may be accessed by a computing device using a Web browser or an application resident on the computing device. The emergency data manager 100 is operative to provide a cloud-based application such as a software-as-a-service (SaaS) accessible remotely using a computer or workstation connected to the Internet and operatively coupled to the emergency data manager 100. The emergency data manager 100 may be implemented as SaaS software executed using a platform-as-a-service (PaaS) that enables development and execution of cloud-based applications.

All of the components of the emergency data manager 100 are operatively coupled by an internal communication bus 301. As used herein, components may be "operatively coupled" when information can be sent between two such components, even though there may be one or more intermediate or intervening components between, or along the connection path. Therefore, any of the various components with the emergency data manager 100, and in other example network entities and devices described herein, may be understood herein to be operatively coupled to each other where appropriate, and to be executing on one or more processors that are further operatively coupled to a memory that stores executable instructions (also referred to as "software code" or "code") for implementing the various components. Operative coupling may also exist between engines, system interfaces or components implemented as software or firmware executing on a processor and such "software coupling" may be implemented using libraries (i.e. application programming interfaces (APIs)) or other software interfacing techniques as appropriate. Such libraries or APIs provide operative coupling between various software implemented components of FIG. 3. A "module" as used herein may be a software component. That is, the data retrieval modules 371, data ingestion modules 373, a geofence module 375, a mapping module 377, and one or more emergency network managers 379 are all operatively coupled to each other via APIs 378 and are operatively coupled to the IP protocol stack 355 and to the application agents 357 via APIs 358.

All of the components and modules described herein may be implemented as software or firmware (or as a combination of software and firmware) executing on one or more processors, and may also include, or may be implemented independently, using hardware such as, but not limited to, ASICs (application specific integrated circuits), DSPs (digital signal processors), hardwired circuitry (logic circuitry), or combinations thereof. That is, any of the components or modules disclosed herein may be implemented using an ASIC, DSP, FPGA executable instructions executing on a processor, logic circuitry, or combinations thereof. In other words, the components and modules may be implemented as hardware, software or by combinations thereof. Therefore, each of the components and modules disclosed herein may be considered a type of apparatus that may be implemented and operate independently from the other components in the system. For example, any one of the data retrieval modules 371, data ingestion modules 373, geofence module 375, mapping module 377, event correlation logic 300, false alarm detection logic 320, or emergency network managers 379 may be implemented using an ASIC, DSP, FPGA, executable instructions executing on a processor, logic circuitry, or combinations thereof.

The various embodiments also include computer readable memory that may contain executable instructions, for execution by at least one processor, that when executed, cause the at least one processor to operate in accordance with the emergency data manager 100 and other functionality herein described. The computer readable memory may be any suitable non-volatile, non-transitory, memory such as, but not limited to, programmable chips such as EEPROMS, flash ROM (thumb drives), compact discs (CDs) digital video disks (DVDs), optical drives, etc., that may be used to load executable instructions or program code to other processing devices or electronic devices such as those that may benefit from the features and methods of operation herein described. The executable instructions may also include the various operating system environments and the kernel. For example, the memory 330, which is a non-volatile, non-transitory memory, may store executable instructions for execution by the at least one processor 310 that when executed, provide the data retrieval modules 371, data ingestion modules 373, geofence module 375, mapping module 377, event correlation logic 300, false alarm detection logic 320, or emergency network managers 379.

The emergency data manager 100 is operatively coupled to a geofence database 101 which stores jurisdictional boundary data for various emergency networks 170 as well as for the national or regional emergency networks. The geofence module 375 is operative to access the geofence database 101 and determine which emergency network 170 should receive specific emergency data obtained by the data ingestion modules 373, based on analysis of the geofences specified in the geofence database 101. The emergency data manager 100 is operative to store and retrieve emergency data from the various databases 120, and may function as an interface between emergency networks, the various databases 120 and devices 160 to receive and store emergency data. The stored emergency data can be transmitted or distributed to emergency networks and emergency responder devices 150 before, during, or after emergencies. The emergency data manager 100 is operatively coupled to a protected data database 191 which stores protected data related to emergencies. Protected data is either not stored by the emergency data manager 100 or is stored only for a predetermined period of time as defined by laws, regulations or policies, in the protected data database 191. The emergency data manager 100 may receive emergency data from any of the devices 160 and such data may include, but is not limited to, locations, medical history, personal information, or contact information. The emergency data manager 100 may receive emergency data from any of the devices 160 and such data may include, but is not limited to, locations, medical history, personal information, or contact information. The emergency network managers 379 are operative to check emergency network credentials to determine authorization and access levels to protected data stored in the protected data database 191 or in the other databases 120.

The emergency data manager 100 includes data ingestion modules 373 and data retrieval modules 371. The data ingestion modules 373 are operative to communicate with the various databases 120 and with the various alarms 196 and sensors 197 to obtain emergency data and may include a location ingestion module, an additional data ingestion module, and one or more multimedia ingestion modules. The location ingestion module is an emergency location service ingestion interface which is operative to post or receive emergency locations. The location ingestion module may be a REST API that is operative to receive an HTTP POST including location data when an emergency alert 105 is generated or when an emergency call 103 is received from a device 160. The location data may include a location generated concurrently or in response to the generation of the emergency alert 105, which may initiate an emergency call 103 or emergency session for requesting emergency assistance. This generated location data may be, for example, location data from a device 160 GPS chipset, such as GPS coordinates. This data may also include data from a device 160 inertial-measurement-unit (IMU). The location data may be generated before an emergency alert 105 such as, for example, when a medical bracelet IMU detects that a patient has fallen. In another example, when an emergency call 103 is made from a device 160, the location ingestion module of the data ingestion modules 373 may receive a location recently generated by the device 160 GPS chipset, or by a device 160 triangulation algorithm, or other device 160 location mechanism, thereby ensuring that a location for the emergency is available as quickly as possible. The location data may include a device-based hybrid location generated by a device 160 which has sent an emergency alert 105. A GPS chipset within the device 160 may generate the location data. The location data may also include a location data generated by a second device 160 that is communicatively coupled to the device 160 that sent the emergency alert 105. For example, a wearable device such as a medical bracelet or smartwatch, that does not include location capabilities, may use the location services location from a mobile phone with which it is paired. The location ingestion module of the data ingestion modules 373 may communicate with a device 160 via a mobile application installed on the device 160 or via firmware or an operating system of the device 160.

The location data generated by a device 160 prior to an emergency occurrence may be accessible by an authorized one (based on device 160 location) of the emergency networks 170 during an emergency. For example, a taxi company may have software that transmits the location of its cars or assets to the emergency data manager 100, or another server, preemptively. Thus, when an emergency arises, the location of the affected taxi can be made accessible quickly to send for help. Further, location data generated by a device 160 after an emergency has commenced may be made accessible to one of the emergency networks 170 during the on-going emergency. For example, updated location data of a hijacked taxi may be periodically transmitted to the emergency data manager 100 and made accessible to one or more of the emergency networks 170.

The data ingestion modules 373 may also provide an interface for posting or receiving static or dynamic emergency profile data. Such additional data may include, but is not limited to, medical data, personal data, demographic data, and health data, which may be obtained from the various databases 120. For example, medical data may include information relating to a person's medical history, such as medications the person is currently taking, past surgeries or preexisting conditions. Personal data may include a person's name, date of birth, height, weight, occupation, addresses such as home address and work address, spoken languages, etc. Demographic data may include a person's gender, ethnicity, age, etc. Health data may include information such as a person's blood type or biometrics such as heart rate, blood pressure or temperature. Additional data may further include data received from connected devices such as vehicles, IoT devices 113, and wearable devices such as medical bracelet 109, smartwatch 111 or other devices, alarms 196 and sensors 197, etc. Each of the sensors 197 may be IoT devices. Some sensors may be clustered and connected to a centralized sensor hub that is operative to connect to the Internet 190 and communicate with the emergency data manager 100 via the data ingestion modules 373.

Some alarms 196 may also be accompanied by, or integrated with, various sensors. For example, intelligent vehicle systems may generate and send sensor data regarding a crash, such as the speed at which the vehicle was moving just before the collision, where the vehicle was struck, the number of occupants, etc. as part of, or along with, a collision alarm indication. The data ingestion modules 373 may be implemented in whole or in part using a REST API, for example using JSON (JavaScript Object Notation).

In one example of operation, if an emergency call 103 is made from a mobile phone, or if an emergency alert 105 is sent, the mobile phone may receive a heart rate of the person who made the emergency call from a smartwatch 111 worn by the person and communicatively coupled to the cell phone via a Wi-Fi™ or Bluetooth™ connection or some other wireless connection. The mobile phone may therefore send the heart rate to the data ingestion modules 373, along with any other additional data, in an HTTP POST. The data ingestion modules 373 may communicate with a device 160 via a mobile application installed on the device 160 or integrated into the firmware or operating system of the device 160. Additional data may also be sent to the data ingestion modules 373 from a network server. The data ingestion modules 373 may be accessed by any connected platform that receives data that might be relevant in an emergency. Connected platforms, such as the various databases 120, may therefore send additional data to the data ingestion modules 373 at any time. A website, web application, or mobile application may communicate with the data ingestion modules 373 and may allow device 160 users to create profiles to send additional data included in the profiles to the data ingestion modules 373 every time a profile is created or updated.

The data ingestion modules 373 may also include a multimedia ingestion module to provide an interface for posting or receiving data such as audio or video streams obtained during an emergency from a device 160 that is proximal to the emergency of from a video camera operating as a sensor 197. In one example of operation, if an emergency alert 105 is generated by an intelligent vehicle system installed in a vehicle in response to the vehicle experiencing a collision, the emergency alert 105 is sent to one of the emergency networks 170 by the intelligent vehicle system or by another device 160 communicatively coupled to the intelligent vehicle system, such as a mobile phone coupled to the intelligent vehicle system via Bluetooth™. In response to generating the emergency alert 105, the intelligent vehicle system, or a proximal camera serving as a sensor 197, may additionally begin streaming audio and video from microphones and cameras. The intelligent vehicle system may include cameras installed inside or outside of the vehicle. The streaming audio and video is streamed to the emergency data manager 100 through the data ingestion modules 373. A mobile phone communicatively coupled to the intelligent vehicle system may additionally or alternatively stream audio or video from microphones and cameras integrated into the mobile phone to the emergency data manager 100 through the data ingestion modules 373. One or more multimedia ingestion modules of the data ingestion modules 373 may be implemented wholly or partly using REST APIs that are accessed with an HTTP POST.

After receiving the relevant data, the data ingestion modules 373 can store the data in one or more databases operatively coupled to the emergency data manager 100, such as the protected data database 191. The emergency data manager 100 may be operatively coupled to databases such as, but not limited to, a location database, the geofence database 101, the protected data database 191 etc. The emergency data manager 100 databases may also be operatively coupled to, or otherwise accessible by, one of the emergency networks 170. The data ingestion modules 373 are operative to tag or otherwise associate received data with an identifier of a user or specific device 160 associated with the data. For example, the data ingestion modules 373 may tag received data with a user ID number, an email address, or a phone number (i.e. caller ID), a MAC address, an alarm ID, a sensor ID, or other device or user identification information, etc. The data ingestion modules 373 may also tag received data based on the data source using, for example, a device name or type, an application name, user name, phone number, corporate account, or etc. All data received by the data ingestion modules 373 is also analyzed by the geofence module 375 to determine which emergency network 170 should receive the data, and by the event correlation logic 200 to determine what segments of data a related to the same event.

An individual or group of individuals may be associated with multiple identifiers. In an example of operation, if the data ingestion modules 373 receive a location generated by a phone associated with the phone number+1-555-555-5555, associated with John Doe, the data ingestion modules 373 may also receive a heart rate from a smartwatch associated with the email address jobndoe@email.com, which is an identifier that is also associated with John Doe. In this example, the data ingestion modules 373 tag the location with the phone number "+1-555-555-5555," and tag the heart rate with the email address "johndoe@email.com," thereby associating both the location and the heart rate with John Doe in the emergency data manager 100 databases. The event correlation logic 200 performs further correlation analysis and may also generated an auto-dispatch signal which is sent to emergency response logic 144 on an emergency network entity 140.

Ingestion data that enters the emergency data manager 100 may include various data fields and associated data entries within the data fields. The emergency data manager 100 maintains a list of expected data fields so that the data entries can be entered within a specific data field.

The emergency data manager 100 may include data retrieval modules 371 such as a location retrieval module, an additional data retrieval module, and one or more multimedia retrieval modules. For example, a location retrieval module may provide an interface for retrieving location data from the emergency data manager 100 databases. The location retrieval module may be implemented wholly or partly via a JSON REST API that is operative to receive a query or request such as, but not limited to, an HTTP GET request, from the emergency networks 170 or an emergency responder device 150.

The data retrieval modules 371 may provide a single GET endpoint for retrieving either the latest or paginated list of locations for a specific caller ID, and/or associated protected data from the protected data database 191. For example, a phone number associated with a device 160 from which a location was received may be included in a header, body, or metadata of a request sent to the data retrieval modules 371. The emergency data manager 100 may then retrieve a location or set of locations from the emergency data manager 100 databases and deliver the location or set of locations to the relevant authorized emergency network 170 or to an emergency responder device 150 associated with the authorized emergency network. The location retrieval module of the data retrieval modules 371 may be a location information server (LIS), in which the LIS may further be a NG911 standards-based XML API for the retrieval of location data from the emergency data manager 100 databases. The location retrieval module of the data retrieval modules 371 may be operative to accept HELD requests from the emergency networks 170 or from emergency responder devices 150 and to return location data for a specific caller ID or anonymous reference.

The data retrieval modules 371 may also include an additional data retrieval module implemented as a JSON REST API for the retrieval of emergency or additional data. Additional data may include, but is not limited to, medical data, personal data, demographic data, health data or other data which may be protected data. Additional data may also include data received from connected devices 160 such as, but not limited to, vehicles, IoT devices, and wearable devices, alarms 196 and sensors 197. The additional data retrieval module of the data retrieval modules 371 may be operative to receive a query or request, such as an HTTP GET request, from an emergency network 170 or emergency responder devices 150. The additional data retrieval module of the data retrieval modules 371 may then, in response to a request, retrieve additional data associated with a specific or particular identifier of a user or a device 160 associated with the user, such as a phone number, and return the data to the emergency network 170 or emergency responder device 150. The data retrieval modules 371 may further include one or more multimedia retrieval modules, which function similarly to the location retrieval module and additional data retrieval module, for the retrieval of data stored in the emergency data manager 100 databases not retrieved by the location retrieval module or additional data retrieval module such as multimedia streaming data.

The emergency data manager 100 determines which of the emergency networks 170 and associated emergency responder devices 150 have authorization to receive particular types of emergency data. The emergency network managers 379 are operative to access emergency network profiles 335 and determine access levels to emergency data for emergency network entities and personnel. For example, a given emergency network 170 or emergency responder device 150 may, in certain circumstances, be granted access only to a particular subset of emergency data. For example, a police officer may only be given access to the location emergency data, while an EMT (emergency medical technician) may only be given access to an additional data emergency data. However, a given emergency network such as a national or regional emergency network, or associated emergency responder device 150, may be given differential access to the entirety of the emergency data, or to particular emergency data categories within the databases based on any factor or set of factors. A management portal may be provided by the emergency network managers 379 to determine which emergency data categories are returned from one of the emergency networks 170 to a particular emergency network 170 or emergency responder device 150. Other data services corresponding to the various databases 120 may also be coordinated with respect to granting access to protected data.

During an emergency, the emergency data manager 100 is operative to detect the emergency and/or otherwise identify the need to provide emergency data pertaining to the emergency. In response to detecting an emergency, the emergency data manager 100 is operative to identify any emergency data pertaining to the emergency stored within the databases 120 and protected data database 191, and retrieve and transmit the pertinent emergency data to the appropriate emergency network 170. The emergency data manager 100 may act as a data pipeline that automatically pushes emergency data to emergency networks that would otherwise be without access to emergency data that is critical to most effectively and efficiently respond to an emergency. Location data stored within, and/or obtained and provided by, the emergency data manager 100, enables emergency responders to arrive at the scene of an emergency faster, and the additional emergency data stored within, and/or obtained and provided by, the emergency data manager 100 enables emergency responders to be better prepared for the emergencies they face. The event correlation logic 300 correlates all incoming data such that a consolidated view of an emergency situation can be provided to an emergency network. The false alarm detection logic 320 performs scoring operations which enable emergency network personnel to prioritize dispatch operations and, in some embodiments, to provide an auto-dispatch function in conjunction with the event correlation logic 300.

The emergency data manager 100 is operative to provide a cloud-based application to multiple emergency networks 170 by establishing network connections via the IP protocol stack 355, with various emergency network entities such as a call handling workstation, CAD workstation etc. Other examples of emergency network entities include, but are not limited to, servers, desktop computers, laptops, routers, switches, etc. that are operative to send and receive data. The network connections may be transport control protocol (TCP) connections and may utilize WebSocket connections between the emergency data manager 100 and an emergency network entity. The geofence module 375 is operative to determine emergency network jurisdictional boundaries and to show the jurisdictional boundaries on a graphical user interface as a jurisdictional map view. The mapping module 377 is operative to generate the jurisdictional map view and to also post emergency data locations as location indicators on the map. For example, location indicators may show the location of incoming emergency calls that the emergency network has received, or is receiving, as well as any incoming alarms and alerts. The emergency network managers 379 provide authentication and login capabilities for the various emergency networks and enable APIs 378 for communication between the emergency network entities and the data ingestion modules 373, data retrieval modules 371, geofence module 375, and mapping module 377.

Emergency networks 170 and their corresponding emergency network entities are associated with a given geographic boundary. Based on the geographic boundary for a respective emergency network 170, a jurisdictional map view customized for the respective emergency network 170 may be generated and provided to emergency network entities 140, such as workstations, for display. Within the jurisdictional map view for a given emergency network 170, location indicators for emergencies occurring within its geographic boundary may be displayed. The jurisdictional map view for a given emergency network 170 may include one or more geofences associated with the respective emergency network 170 and surrounding areas.

The geofence module 375 is operative for managing geofence data for emergency networks 170 including assigning geofences to one or more emergency responder devices 150 or emergency network members, etc. The emergency data manager 100, via the geofence module 375, is operative to filter all incoming emergency data related to devices 160, by geofences. Emergency networks 170 utilize geofences that define jurisdictional boundaries within which a specific emergency network is authorized to respond to emergencies. For example, a city police department may have jurisdictional authority over the entire city, or of only a portion of the city. A geofence would represent the perimeter of the portion of the city that the respective police department serves. A geofence may therefore be considered a representation of a virtual perimeter overlaying a real-world geographic area.

Geofences may be used to define a county boundary, a state boundary, a collection of postal/zip codes, a collection of cell sectors, or etc. A geofence may be defined using simple shapes such as rectangle, triangle, circle, etc., or may be defined using complex polygons, etc. Geofences may also refer to approximations where the "approximated" geofence encloses an approximation of a jurisdictional boundary or some other boundary and may also include buffer regions extending outside the perimeter, for example one-mile or such beyond the primary geofence perimeter.

Some geofences can be dynamically generated by the emergency data manager 100. For example, a dynamic geofence may be generated as a radius around a point location at which an emergency is occurring. In another example, a geofence may be represent non-emergency network boundaries such as school zones or neighborhood boundaries, etc. The use of a geofence is referred to as geofencing. One example of geofencing involves a location-aware device or a location-based service (LBS) monitoring when the device enters or exits a given geofence. This means that the device is monitored within the geographic boundaries defined by the given geofence. Entry or exit from given geofence by the device may trigger an alert to the device's user as well as messaging a given network monitoring the geofence. The monitoring network may be an emergency network 170 but could be other types of networks as well. The geofence information may contain the device location, which could be sent to a mobile telephone, an email account or to some other system or network entity.

In the context of emergency services, one or more geofences may correspond to the jurisdictional boundaries of an emergency network 170. The emergency network 170 may be operated by a public entity and may be for example, a public safety answering point (PSAP), a police department, a fire department, a federal disaster management agency, national highway police, etc., which have jurisdiction over a designated area and, sometimes, overlapping areas. Geofences are used to define the jurisdictional boundaries using various Geographic Information System (GIS) formats. A GIS file format refers to one or more standards for encoding geographical information into a computer file.

For maintaining the privacy, security and integrity of emergency data, geofencing is applied to ensure that emergency data flows only the emergency network 170 having authority to access the information and responds to the given emergency. Applying geofence filters to the emergency data also allows additional avenues for monitoring, both visibility and control, over the emergency data manager 100 to detect anomalies or spikes and to reduce the risk of security breaches. The geofence module 375 monitors all accesses to emergency data, both incoming and outgoing from the emergency data manager 100 and is operative to filter emergency data to the appropriate authorized emergency network 170 or emergency responder device 150.

In an example of emergency data manager 100 operation, an emergency alert may be triggered by a given device 160, for example by fall detection, by a user pressing a soft button, a physical button, initiating a voice command, or gesture, or autonomously based on sensor data such as from a smoke detector. In this example, the user may be prompted to confirm the emergency or otherwise provide authorization for sending the emergency alert. However, for a fall detection scenario, a confirmation would not be required because the patient may be incapacitated. Emergency data, such as an enhanced location and additional data regarding the user, such as the user's medical history, may then be delivered by the device 160 to the emergency data manager 100 and stored in a database such as protected data database 191. The emergency data manager 100 may format the emergency data into a format that is compatible with industry standards for storing and sharing emergency data. For example, the emergency data may be formatted to be compatible with National Emergency Number Association (NENA) standards. The emergency data manager 100 may then perform a push operation to push the emergency data to an authorized emergency network entity. After the push operation, the emergency data manager 100 may delete any temporarily stored data if required for compliance with privacy laws, regulations and policies. For medical data, the emergency data manager 100 may push a candidate profile that provides basic information to be used by emergency network 170 personnel to identify a patient. Once the emergency network 170 personnel select the candidate profile on their GUI 143, the protected data for which they are authorized to receive will be pushed to their emergency network entity 140. Likewise, emergency personnel in the field may receive the protected data using an emergency data application and via a GUI 155 on an emergency responder device 150.

Alternatively, or in addition to push operations, emergency data may also be obtained by the emergency networks 170, such as by a PSAP responding to an emergency alert, by sending a query to the emergency data manager 100. The query may be an emergency data request using, for example, an HTTP GET request. The emergency data request may also be in the form required by the Location Information Server (LIS) protocol. In response to the emergency data request, the emergency data manager 100 sends an appropriate response including relevant emergency data to the requesting party via an encrypted pathway. The emergency data request may be in the form of an HTTP-Enabled Location Delivery (HELD) and the response from the emergency data manager 100 may be in the form of a Presence Information Data Format Location Object (PIDF-LO) as defined by the Internet Engineering Task Force (IETF).

The emergency data request includes an authorization code, also referred to as an "authorization token", in the body, header, or metadata of the request, and the emergency data manager 100 checks that the authorization code is active before providing a response to the requesting party. Authorization may be provided in the "Authorization" header of the emergency data request using HTTP Basic Authentication. For example, authorization may be a base64-encoded user name and password for an account associated with the requesting party. Emergency data requests are sent over public networks using API access keys or credentials. Transport Layer Security (TLS) may be used in the requests and responses from the emergency data manager 100 for encryption security. In some implementations, the API access keys or credentials are sent using Extensible Markup Language (XML) in a message header and may be further encrypted for additional security. If an emergency data request includes an inactive or expired credential or access key, an error response may be generated and sent to the requesting entity by the emergency data manager 100. The emergency network managers 379 are operative to verify the access keys or credentials and enable the data retrieval modules 371 to respond to verified authorized emergency data requests by sending the pertinent emergency data.

Emergency data may include locations and additional data such as protected data. Emergency data may include one or more emergency data categories, also referred to as "data categories". The emergency data categories may include, for example: service data reference, full name, email, emergency contacts, addresses, language, occupation, phone numbers, websites, gender, height, weight, ethnicity, profile picture, allergies, medical conditions, medications, disabilities, blood type, medical notes, birthday, and additional comments. Emergency data categories may be tagged with tags for specific types of data such as "demographics" or "medical data." For example, gender, height, weight, ethnicity, profile picture (image-url) may be tagged as demographic data. Medical data protected under HIPAA and other laws may be tagged as "HIPAA" or "private." Medical data may include information on one or more of allergies, medical conditions or illnesses, medications, disabilities, blood type, medical notes, and other medical information. Medical information protected under HIPAA are encrypted and/or anonymized. Some data are tagged as "general" or another similar tag, wherein access is not specifically restricted.

The emergency data manager 100 may store emergency data requested by an emergency network entity 140 in a remote database, such as the protected data database 191, for a certain period of time after receiving the request for the emergency data regarding a user and any electronic devices 160. A purge period of time may be set as a timer value, such as a timer countdown or a set time point, which may be defined by the emergency network that sent the emergency data request. An emergency data purge period may be, for example an interval between one to forty-eight hours, or between one to twelve hours. However, a purge period may be less than one hour due to security and privacy concerns, such as between one and forty-five minutes, or any time interval from five to thirty minutes.

After a timer for an emergency data purge has expired, and if no new requests for the emergency data pertaining to the particular user and the particular electronic device 160, or other devices associated with the user, are received, the emergency data manager 100 may mark any particular related database entries for deletion and wait for another, different, time-out interval. After a particular second time-out interval has also been completed, and if no new requests for emergency data for the particular user or associated electronic devices 160 are received, then the emergency data manager 100 may remove the specific marked entries from the databases in the next cycle of database updates.

After adding the emergency data in a database such as protected data database 191, the emergency data manager 100 may proceed to keep updating the emergency data on a periodic, or as-needed basis. In other words, the data regarding a user or electronic device 160 is kept current such that the most recent and accurate emergency data can be provided to emergency responders. The emergency data manager 100 is updated with emergency data from devices 160, and/or databases 120, for all the emergency data pertaining to all users and their associated electronic devices 160. As an alternative to having a purge period defined by a timer, a purge period may be based on an on-going emergency session such as an emergency call. For session-based purging, emergency data may be deleted after the emergency session has been terminated. To further ensure that the specific emergency data is no longer required, session-based emergency data purging may be performed after a predetermined time delay following emergency session termination, such as a time delay of between one and fifty minutes. A time delay is also beneficial in the case of dropped calls, follow-up calls, etc.

In some non-emergency situations, there is a need to access location data, user data, emergency data or sensor data. For example, a user of an electronic device 160 may grant authorization to family members to access the user's location data. Accordingly, if a family member requests location data for a user, access is granted if there is proper authorization. In another example of location data access, an employee may be required to share location data with an employer, for example through a corporate operations center, such that the corporate operations center is notified when the employee is in an emergency. In another example, a taxi operations company may request and obtain location data of one or more fleet members to keep track of its vehicles, for example, via an onboard vehicle console or terminal. All of these emergency data accesses are monitored by the emergency data manager 100 and are subject to proper authentication credential before being provided.

Figure 4:
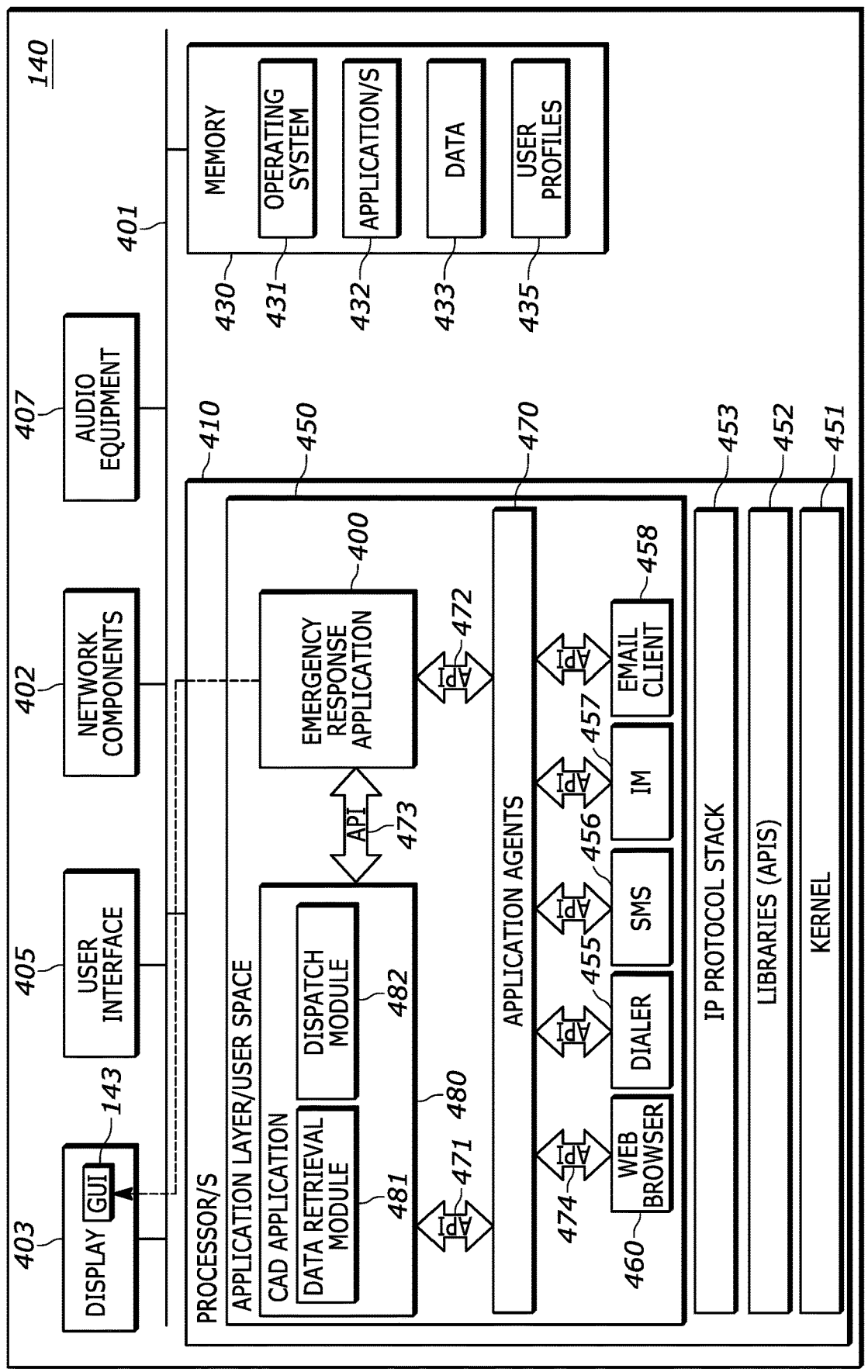
FIG. 4 is a diagram of an example emergency network entity having an emergency response application in accordance with one embodiment.

FIG. 4 provides an example emergency network entity 140 which is a computer aided dispatch (CAD) workstation and is one example of an emergency network entity. An emergency network may be implemented with multiple emergency network entities of various kinds and therefore may have multiple workstations for example one or more call handling workstations, one or more CAD workstations, etc., in addition to routers, switches, hubs, access points, and other emergency network entities, etc. The example CAD emergency network entity 140 may include a display 403, a user interface 405, audio equipment 407, network components 402, at least one processor 410, and at least one non-volatile, non-transitory memory 430 in addition to RAM. All of the components of the emergency network entity 140 are operatively coupled by an internal communication bus 401. The network components may include one or more network transceivers for Ethernet connectivity to other workstations and devices and an Internet connection. The memory 430 stores executable instructions and data such as executable instructions for an operating system 431 and various applications 432. The memory 430 also stores data 433 which may provide data caching. User profiles 435 store emergency network personnel profiles including login credentials for authorized users of the emergency network entity 140.

The processor 410 may be implemented as one or more microprocessors, DSPs, ASICs, FPGAs, microcomputers, microcontrollers, digital signal processors, central processing units, state machines, logic circuitries, and/or devices that manipulate signals based on operational instructions. Among other capabilities, the processor 410 is configured and operative to fetch and execute computer-readable instructions (i.e. executable instructions) stored in the memory 430. For example, the applications 432 executable instructions, when executed by the at least one processor 410, may provide an operating system, a dialer application 455, a short-message-service (SMS) application 456, an instant message (IM) application 457, a web browser 460, an email client 458 and one or more instant message (IM) and voice applications which may each provide IM and voice call capability separately or in combination. The operating system may include a kernel 451, libraries 452 (also referred to as "application programming interfaces" or APIs), an IP protocol stack 453, and an application layer 450 or user space within which the various applications are executed.

In the example emergency network entity 140 of FIG. 4, the applications 432 executable instructions, when executed by the at least one processor 410, provide a standalone emergency response application 400 with associated GUI 143, a computer aided dispatch (CAD) application 480 including an data retrieval module 481, a dispatch module 482, and an associated GUI 142 described in FIG. 1. In the example implementation illustrated in FIG. 4, the emergency response logic 144 shown in FIG. 1 is operatively implemented as the standalone emergency response application 400 in accordance with an embodiment.

The standalone emergency response application 400 is operative to communicate with the emergency data manager 100 and to request emergency data such as medical data and other emergency data which may be protected data. For example, an API 472 enables communication between the emergency response application 400 and the IP protocol stack 453. Application agents 470 may also enable communication between the emergency response application 400 and other applications such as the web browser 460 which uses an API 474. The CAD application 480 may also communication with other applications using an API 471, and with the emergency response application 400 via an API 473.

The GUI 143 of the emergency response application 400 is operative to communicate with the emergency data manager 100 to send emergency data queries using a device identifier, and also to receive emergency data that is pushed to the emergency response application 400 by the emergency data manager 100. The event correlation logic 300 and false alarm detection logic 320 also communicate with the emergency response application 400 to provide a queue of alarm events and to provide consolidated indicators of correlated events. The emergency response application 400 may also receive event scoring information from the event correlation logic 300 and false alarm detection logic 320. In some embodiments, the emergency response application may perform auto-dispatch operations based on inputs receive from the event correlation logic 300 and false alarm detection logic 320.

The emergency response application 400 provides the GUI 143 on the emergency network entity display 403, and displays augmented emergency data such as, but not limited to, augmented location data received from the emergency data manager 100, and sensor data related to alarm events in an alarm queue. Communication is established between the emergency response application 400 and the emergency data manager 100 using the IP protocol stack 453 and a network connection is established which may be a TCP connection and which may include one or more WebSocket connections.

Figure 5:
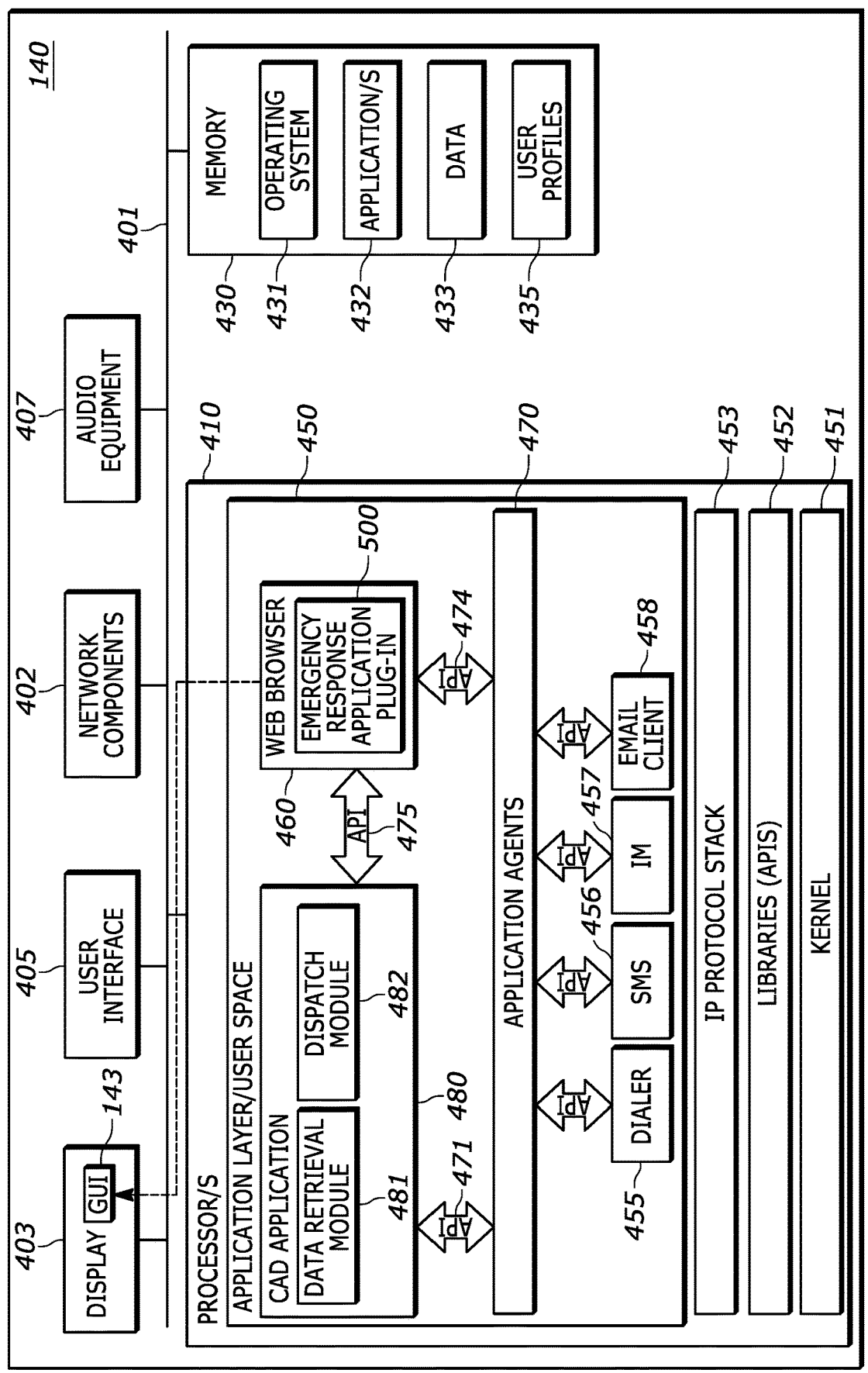
FIG. 5 is a diagram of an example emergency network entity having an emergency response application plug-in accordance with one embodiment.

FIG. 5 is a diagram illustrating another example emergency network emergency network entity 140 having an emergency response application plug-in 500 with a Web browser 460 in accordance with another embodiment. In the example implementation of FIG. 5, the Web browser 460 communicates with the emergency data manager 100 to provide the GUI 143 as a SaaS interface. In other words, the emergency response application plug-in 500 is operative to use an established IP protocol stack 453 connection between the emergency network entity 140 and the emergency data manager 100 using the Web browser 460. The emergency response application plug-in 500 is operative to receive pushed emergency data from the emergency data manager 100 and display the emergency data on the GUI 143. The emergency response application plug-in 500 in conjunction with the Web browser 460 also enables emergency data queries to the emergency data manager 100 to obtain emergency data, in addition to any emergency data received via a push operation. In some embodiments, the emergency response application plug-in 500 may communicate with the CAD application 480 via an API 475 to send and receive data such as, but not limited to, ALI/ANI (Automatic Location Identification/Automatic Number Identification) data, ELS data, AML data, etc. An emergency data query sent to the emergency data manager 100 by the emergency response application plug-in 500 may utilize one or more WebSocket connections.

Figure 6:
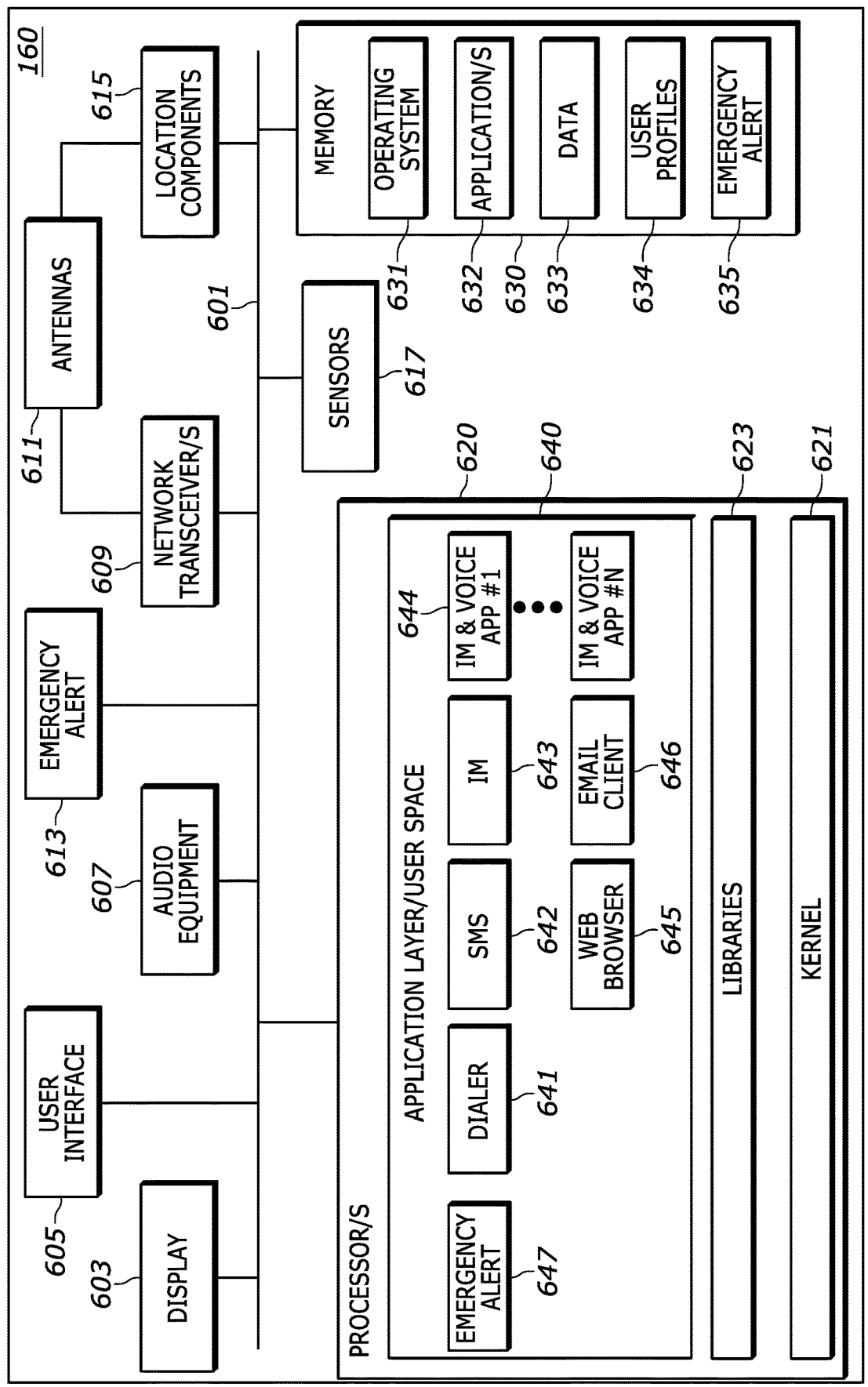
FIG. 6 is a block diagram providing an example of internal components of a device which may be used as an emergency caller device or to send an emergency alert.

FIG. 6 is a block diagram providing an example of internal components of a device 160. It is to be understood that FIG. 6 is an example only, and that a given device 160 may have more components, less components, or different components than shown, depending on the specific function and type of device. Further, depending on the type of device, there may be hardware only, hardware and firmware, hardware and software, etc. and may therefore be implemented in various ways not limited by the components shown in the FIG. 6 example. The example device 160 may be, but is not limited to: a mobile or cellular phone such as a smartphone; a wearable device such as a medical information bracelet, a fitness tracker or a smartwatch; a computer, laptop, or tablet; a vehicle console; an Internet of Things (IoT) device, such as a home assistant (e.g., a connected speaker) or a connected sensor such as a connected smoke and carbon monoxide alarm, a burglar alarm, etc.; or a walkie-talkie or two-way radio; etc. The example device 160 may include a display 603, a user interface 605, audio equipment 607, network transceiver/s 609, antennas 611, location components 615, sensors 617, at least one processor 620, and at least one non-volatile, non-transitory memory 630 in addition to RAM. Network components may include one or more wireless network transceivers for wireless communication such as for cellular communication, Wi-Fi™, Bluetooth™, etc. The memory 630 stores executable instructions and data such as executable instructions for an operating system 631, various applications 632 and an emergency alert application 635 in some implementations. The memory 630 also stores data 633 which may provide a location data cache and a user data cache. The device 160 may, in the case of mobile telephones, include a SIM card or other removable, replaceable memory components in addition to memory 630. The location data cache be used to store locations generated by the one or more location components 615 which may include a GPS chipset, triangulation processing, or other location determination technology, etc. User profiles 634 stored in memory 630 may contain information related to specific devices user configuration preferences, data sharing permissions, etc.

The processor 620 may be implemented as one or more microprocessors, ASICs, FPGAs, microcomputers, microcontrollers, digital signal processors, central processing units, state machines, logic circuitries, and/or devices that manipulate signals based on operational instructions. Among other capabilities, the processor 620 is configured and operative to fetch and execute computer-readable instructions (i.e. executable instructions) stored in the memory 630. For example, the applications 632 executable instructions, when executed by the at least one processor 620, may provide, a dialer application 641, a short-message-service (SMS) application 642, an instant message (IM) application 643, a web browser 645, an email client 646 and one or more IM and voice applications 644 which may each provide IM and voice call capability separately or in combination. The IM and voice applications 644 are referred to as "over-the-top" applications because the operate within the application layer of a mobile operating system. The operating system 631 executable instructions, when executed by the at least one processor 620, may provide a kernel 621, libraries 623 (also referred to as "application programming interfaces" or APIs) and an application layer 640 or user space within which the various applications are executed.

All of the components of the device 160 are operatively coupled by an internal communication bus 601. The display 603 is operatively coupled to the user interface 605 or may be considered a part of the user interface 605 such as in the case of a touchscreen which is both a display and a user interface in that it provides an interface to receive user input or user interactions. In some devices, the display 603 may not include a touchscreen, but may include one or more lights, indicators, lighted buttons, or combinations of these. The user interface 605 may also include physical buttons such as an on/off button or volume buttons, and the audio equipment 607 may include a microphone and a speaker.

The example device 160 may also include various accessories that allow for additional functionality. Such accessories (not shown) may include one or more of the following: a microphone, a camera, speaker, a fingerprint scanner/reader, health or environmental sensors, a USB or micro-USB port, a headphone jack, a card reader, a SIM card slot, or any combination thereof. The one or more sensors may include, but are not limited to: a gyroscope, and an accelerometer which may be incorporated into an Inertial Measurement Unit (IMU); a thermometer; a heart rate sensor; a barometer; or a hematology analyzer, or some other type of biometric sensor.

An emergency alert component 613 may be an ASIC or may be implemented as, or in conjunction with, an emergency alert application 647 where the emergency alert application 635 executable instructions are stored in memory 630 and executed by the processor 620. The emergency alert component 613 may be configured and operative to record user data, such as a name, address, or medical data of a user associated with the device 160. The emergency alert component 613 may also detect an emergency using features of the device 160 for example, when a user places an emergency call on a device that has phone call capabilities. The emergency alert component 613 may also work in conjunction with "fall detection" such as in a medical bracelet which uses the sensors 617, such as an IMU (inertial-measurement-unit), to detect if the wearer of the bracelet has fallen and to initiate an emergency call or emergency alert accordingly. The emergency alert component 613 may also work in conjunction with sensors 617 such as biometric sensors to detect for example, a cardiac event or some other critical health or safety event and to initiate an emergency call or emergency alert accordingly.

A device 160 user may initiate an emergency alert 105 by interacting with the user interface 605, or the emergency may be detected by sensors 617. In response to detecting an emergency alert or a request for assistance, such as a via native dial 9-1-1 call via the dialer application 641 (which is the phone's native dialer), which may be generated or sent by the device 160, the emergency alert component 613 may send a notification to the emergency network. The notification may be sent as an HTTP post containing information regarding the emergency request for assistance. The notification may include a location (e. g., a device-based hybrid location) generated by or for the electronic device. In response to detecting an emergency request generated or sent by the device, the emergency alert component 613 may send user data to the emergency network.

Figure 7:
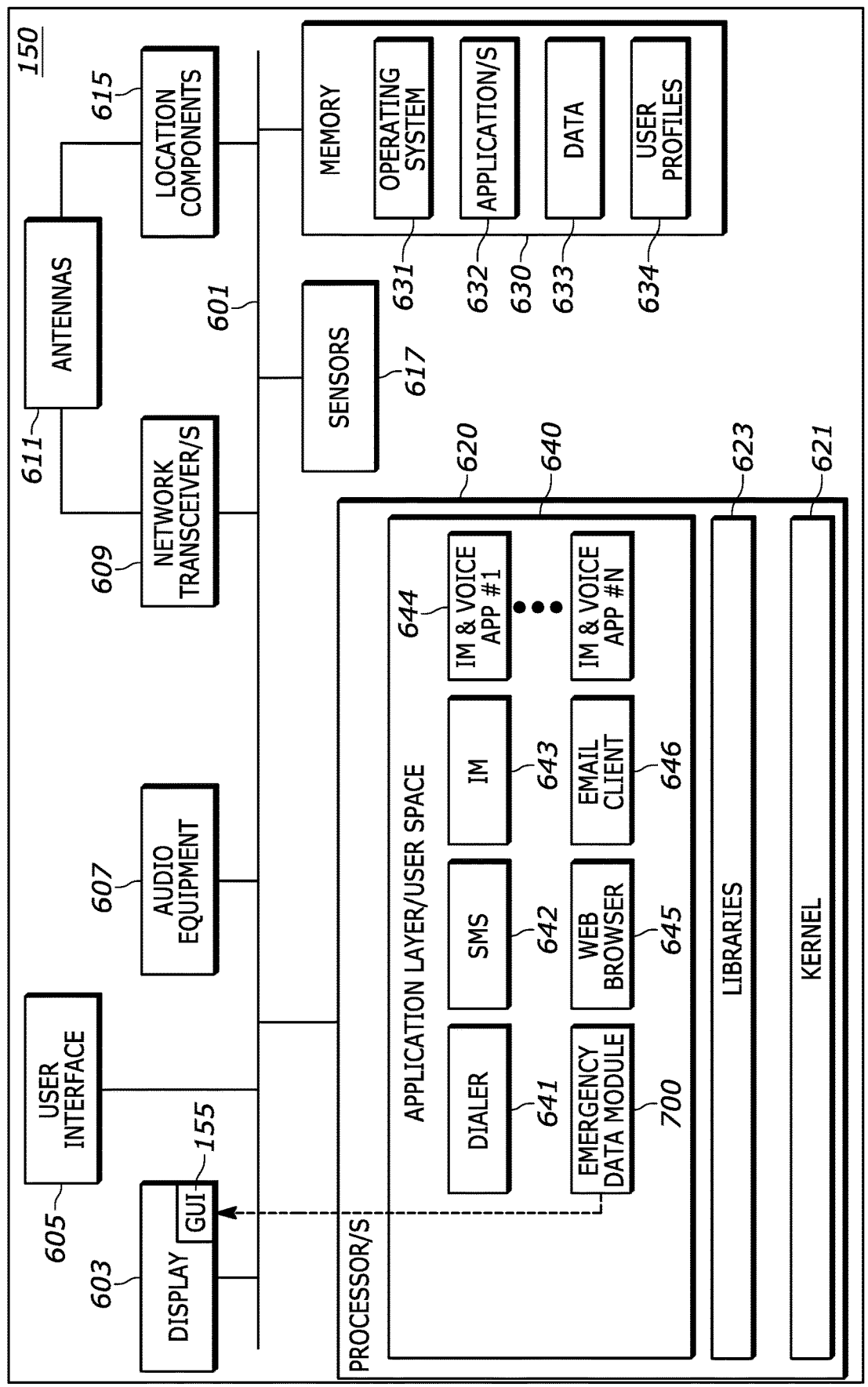
FIG. 7 is a block diagram providing an example of internal components of an emergency responder device which may be used to receive emergency data.

FIG. 7 is a block diagram providing an example of internal components of an emergency responder device 150 which may be used to receive emergency data. The internal components of the emergency responder device 150 are similar to the internal components of device 160 described with respect to FIG. 6. However, the emergency responder device 150, may include an emergency data module 700 that provides the GUI 155 for displaying emergency data including medical data, location data, etc. The emergency data module 700 may be implemented as an application executed by the at least one processor 620. Emergency responder devices 150 are designed to display emergency data related to incidents within authoritative, administrative or assigned jurisdiction of the specific responder, and for which proper credentials are provided depending on the type of emergency data requested. The credentials of the responders may be matched to one or more geofences and incidents with current location within the geofences are displayed. Emergency responder devices 150 may display incidents based on a proximity radius on an interactive map. For example, a proximity radius may be within 10 meters to 5 kms, between 50 meters to 1000 meters, for example 500 meters. As the responder moves towards an area, new incidents within the proximity radius may be "unlocked" and viewed.

The emergency responder devices 150 are operative to send emergency data requests 151 to the emergency data manager 100 and also authentication data. The emergency data manager 100 may send an authentication request 154 to an emergency responder device 150 prior to receiving authentication data. The authentication request 154 may be, for example, a GUI 155 prompt to enter an authentication code. The authentication code may be a numerical code, a pattern, a biometric identifier, or a combination of these. The biometric identifier may be obtained from a patient at the scene of an emergency or may be a biometric that identifies the emergency responder. For example, either a device 160 owned by a bystander, or an emergency responder device 150, may receive an authentication request 154. In that case, where information is being obtained from a patient, the authentication request 154 may be a GUI prompt to scan an authentication code such as, but not limited to, a bar code, QR code, or RFID code on a medical bracelet or some other mechanism or a static code such as obtainable from a label, identification card, etc. In some implementations, an authentication code may be a dynamic code that may be generated by the emergency data manager 100, or by another server, using random or pseudorandom code generation techniques. For data security, the generated authentication code may be conveyed to a device, that allegedly sent an emergency data request 151 to the emergency data manager 100, by using SMS (short message service), email, a callback, etc. The emergency responder devices 150 may have biometric sensors or may be operative to connect to biometric sensor accessories such as, but not limited to, photoplethysmography sensors, fingerprint scanners, palm print scanner, facial recognition, retinal or iris scanners, hand geometry detection, ear geometry detection, odor/scent detection, DNA, behavior characteristics, or other biometric sensors, etc. A biometric identifier may be obtained from any of such biometric sensors or biometric sensor accessories and may be a combination of two or more biometric sensor measurements. If the emergency responder device 150 user is authorized, then the emergency data manager 100 will respond to an emergency data request 151 by providing emergency data 157 from various emergency data databases 120. The emergency responder devices 150 each have a web browser application or other application that provides the GUI 155 for displaying emergency data 157. The emergency data databases 120 may include, but are not limited to, location data 121, medical data 123 and other emergency data 125. Emergency data requests may also be sent from the GUI 143 during call handling procedures, emergency dispatch procedures or both, and emergency data requests 151 may be sent from the GUI 155 by an emergency responder device 150. Authentication data may also be sent by the GUI 155, or may be sent automatically by the emergency responder device 150 as part of, or in conjunction with, an emergency data request 151 initiated by an emergency responder device 150 user.

In response to an emergency data request 151 from an emergency responder device 150, the emergency data manager 100 may request authentication data prior to sending any protected data. Alternatively, an emergency responder device 150 may send authentication data to the emergency data manager 100 at the time of sending the emergency data request 151. If the authentication data authenticates the emergency responder device 150, then the emergency data manager 100 sends an appropriate response including relevant emergency data 157 to via an encrypted pathway. The emergency data request 151 may be, for example, an HTTP-Enabled Location Delivery (HELD) message and the response from the emergency data manager 100 or the emergency data manager 100 may be a Presence Information Data Format Location Object (PIDF-LO) in accordance with NENA requirements.

For some emergency networks, emergency data requests 151 may be sent over public networks using API access keys or credentials. Transport Layer Security (TLS) may be used in the emergency data requests to the emergency data manager 100 and for sending emergency data 157 to emergency responder devices 150 for encryption security. The emergency responder device 150 may display the emergency data 157 using a web portal GUI or an application GUI.

Figure 8:
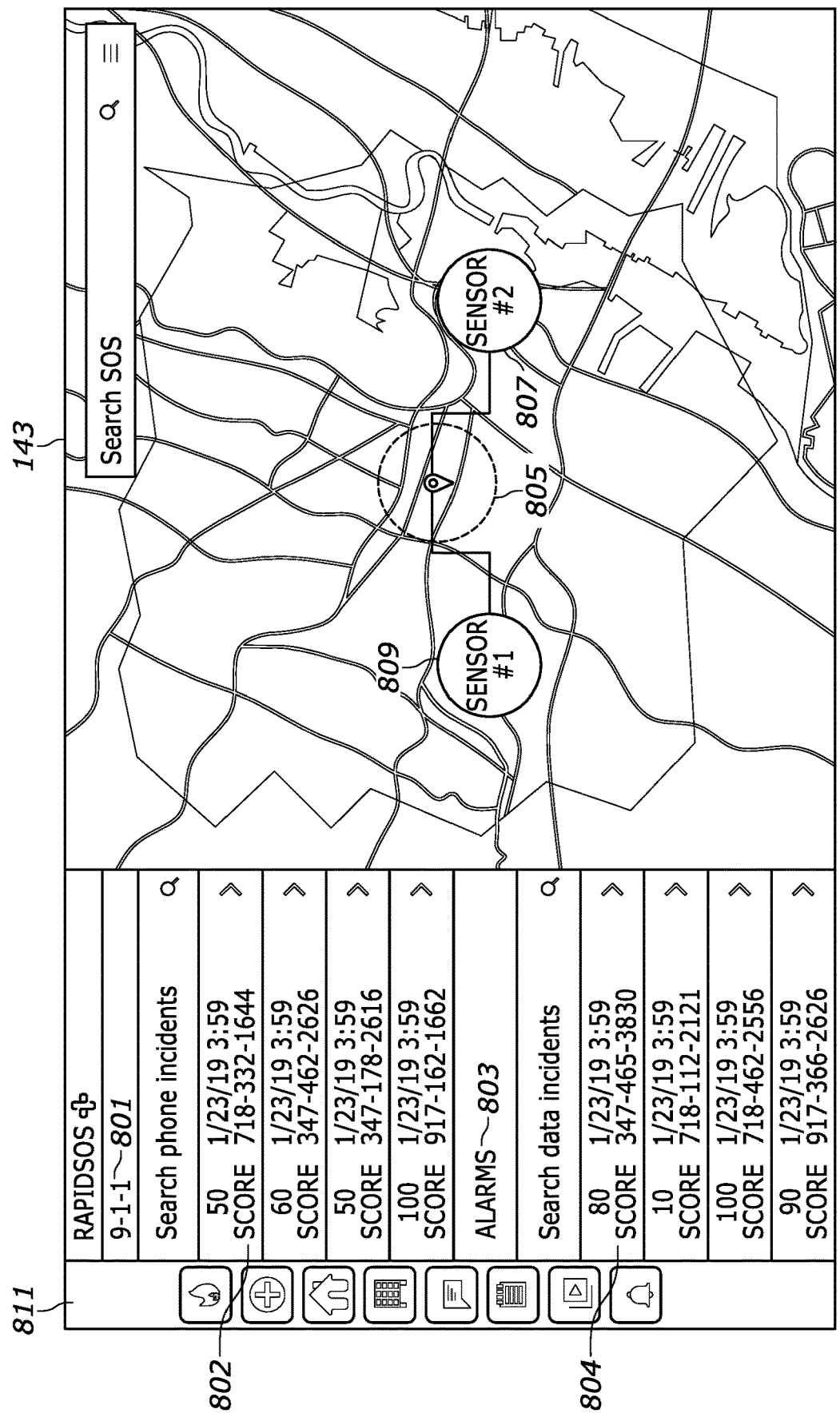
FIG. 8 is an example graphical user interface (GUI) displayed on an emergency network entity display in accordance with an embodiment.

FIG. 8 is one example screen of the graphical user interface (GUI) 143 that may be displayed on an emergency network entity 140 display in accordance with an embodiment. The display screen shown in FIG. 8 includes a map section displaying a location indicator 805 for a correlated event in which sensor data from a first sensor 809 and from a second sensor 807. The correlated event corresponding to location indicator 805 has been correlated to an alarm from an alarm queue 803, which is shown on the left-hand side of the GUI 143 screen. The left-hand portion of the GUI 143 screen provides a call queue 801 for 9-1-1 emergency calls, and an alarm queue 803 showing information related to incoming alarms coming from alarms 196 as illustrated in FIG. 1. The event correlation logic 200 provides the correlated event information corresponding to the location indicator 805 and also generates severity scores displayed in an emergency call score field 802 of each queue entry related to incoming emergency calls and a score field 804 related to each incoming alarm in the alarm queue 803. The alarm queue scores may be generated by the false alarm detection logic 210 as a representation of confidence level that an alarm is legitimate and is not a false alarm. For example, an alarm score of 100 would indicate that the alarm is considered to be legitimate and requiring dispatch of emergency responders. The emergency network operating the emergency network entity may have determined threshold scores that determine when emergency responders are dispatched to events in the call queue 801 and alarm queue 803 based on the score values. The side menu 811 allows a user to limit the call queue 801 and alarm queue 803 view to specific emergency event types and locations such as residential, commercial, fire, medical, etc.

Figure 9:
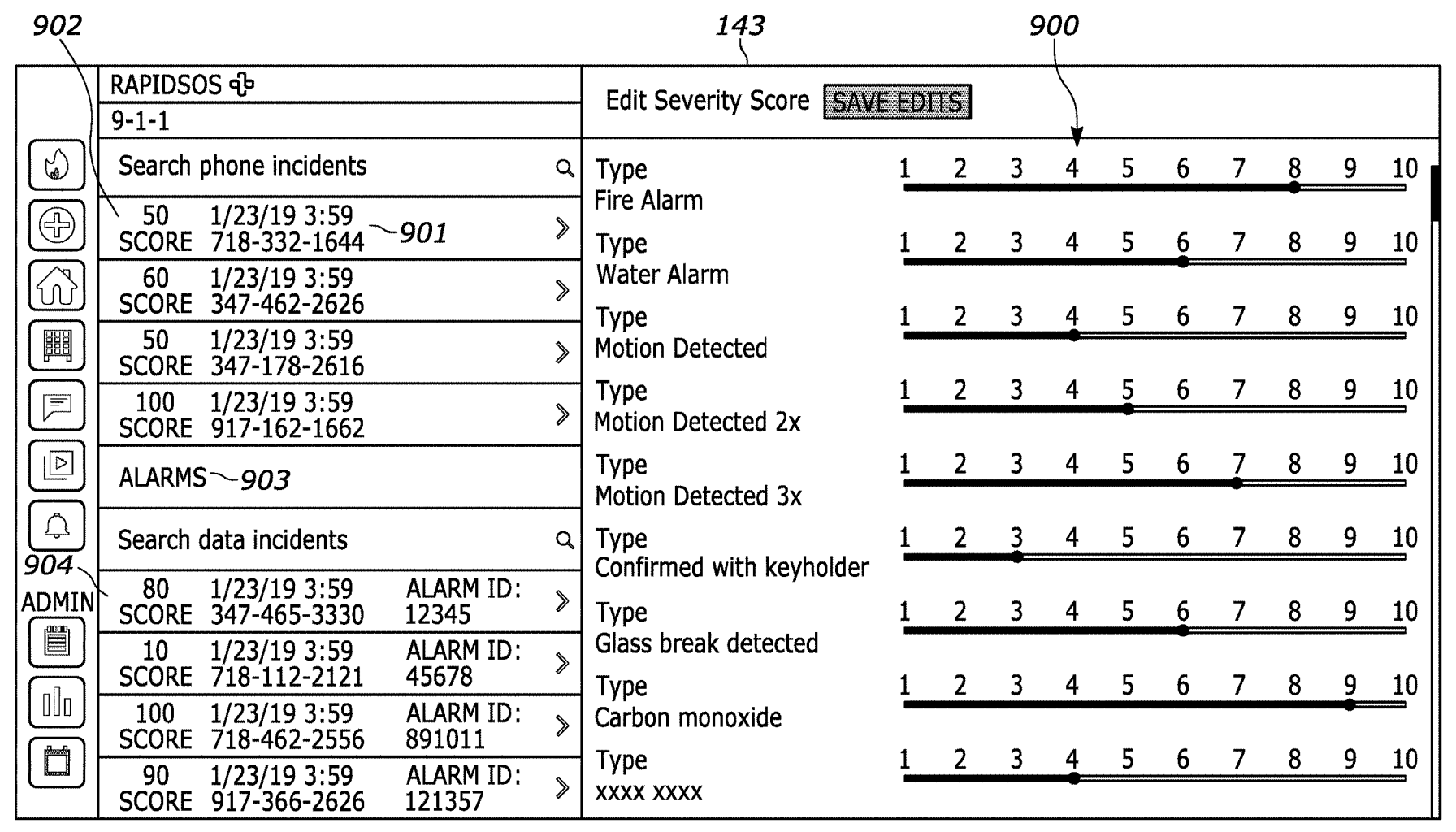

FIG. 9 is another example screen of the graphical user interface (GUI) 143 that may be displayed on the emergency network entity 140 display in accordance with an embodiment. The GUI 143 screen shown in FIG. 9 has a call queue 901 and an alarm queue 903, similar to the GUI screen illustrated in FIG. 8. However, in FIG. 9, the right-hand side of the screen displays an alarm type list and an indicator scale 900 for each alarm type that indicates the number of alarms of that type that have been detected. For example, eight fire alarms are present in the alarm queue 903. As a dispatch operator dispatches emergency service personnel to the alarm scene the number of alarms in the alarm section indicator scale 900 may be reduced to indicate that the alarm was handled or resolved. Alarms confirmed with the keyholder may correspond to prioritized alarm data 213 received from screener networks 207 by the event correlation logic 200. Each prioritized alarm that includes an indicator from the screener network 207 that keyholder confirmation has been received will be added to the count of "confirmed with keyholder" type alarms on the indicator scale 900. Confirmed alarms may be given a severity score of 100 by the false alarm detection logic 210.

Each of the alarm types in the alarm type list may be color-coded such that the alarms in the alarm queue 903 each have a color corresponding to the specific alarm type. For example, alarm 904, which is the first alarm the alarm queue 903, may be a fire alarm and therefore the text of the alarm ID or the alarm score may be displayed in a color that matches the color of the fire alarm type displayed in the alarm list in the indicator scale 900 display field.

The scores provided in the call queue 901 and the alarm queue 903 are generated by the event correlation logic 200 and the false alarm detection logic 210. For example, the first alarm entry in the alarm queue 903 has a score of 80. If the alarm is a burglar alarm, sensors may be used for validation of the burglar alarm such as, but not limited to, motion detectors, glass break detectors or cameras. Thus for example, in the indicator scale 900 display field, if a "motion detected three times" sensor has been detected that is correlated with the first alarm having alarm ID "12345", along with a glass break sensor indication, then this may have resulted in a score of 100 which is a score that the particular alarm is not a false alarm. However, if a burglar alarm had a correlated glass break detection, but only a single occurrence motion detection, then the burglar alarm may have received a lower score such as 80, for example.

In another example emergency call 902 has a score of 50. If more than one emergency call has been received for the same emergency, for example a fire emergency, then a score of 50 or above may indicate multiple calls for the same emergency. The score may also reflect that sensor data or alarm data corroborates the emergency call. The exact significance of the score values may be determined by each emergency network's specific operating procedures or operating requirements and the event correlation logic 200 and false alarm detection logic 210 can be adjusted accordingly to reflect the procedures and requirements in the scoring. As an example, some emergency networks may decide that correlated events with a score of 50 or higher should be auto-dispatched because there is sufficient data available to warrant the decision. In that case, correlated events with a score of 50 or less would be handled by the call takers or dispatch operators and involve a human decision maker for making a dispatch decision. In other words, the scores shown in the figures are for example only and the threshold value can be set based on operating procedures and requirements of the emergency network operators such as municipalities, individual police and fire departments, emergency medical service providers etc. More particularly, each emergency network may have its own scoring requirements. In other scenarios however, the scoring values may become standardized and only the thresholds determined individually by emergency network operators.

The scores are multifunctional and may provide a confidence level in an alarm, an indication of emergency severity, and also provide an indication that a call or alarm corresponds to a correlated event having data from multiple sources. More particularly, a "correlated event" is an event that has more than one point of data relevant to the event such that there are multiple sources of data. The term "event" as used herein refers to an indication of an incoming emergency such as an emergency call or emergency alert, and alarm, or a sensor data indication that an emergency may be occurring. Each alarm type count or sensor type count on the indicator scale 900 corresponds to an "event."

An event type may be a fire emergency event, a police emergency event and a medical emergency or other specially defined event which may be sub-events of fire, police and medical emergency events. Examples of sub-events for a medical emergency may be anaphylactic shock, cardiac arrest, epileptic seizure, bleeding, asthma attack, etc. Examples of sub-events for a police emergency may be burglary in-progress, armed robbery in-progress, active shooter, riot, etc. Examples of sub-events for a fire emergency may be, residential fire, office complex, high-rise, school, etc. Correlated events may consist of two or more different event types. For example, a correlated event may include a fire emergency and a medical emergency, or a police emergency and a medical emergency, etc.

Further in FIG. 9 each incoming emergency call in the call queue 901 is an event, and each incoming alarm in the alarm queue 903 is an event. In one example of a "correlated event," an incoming emergency call and an incoming alarm may be related to the same emergency. Therefore, these two "events" may be consolidated into a "correlated event." For example, if an emergency call in the call queue 901 is correlated to the burglar alarm having alarm ID 12345, then the event correlation logic 200 may display only a single event in the queue. In the specific example of the burglar alarm event having a correlated emergency call event, the emergency call event may be displayed with a high confidence or severity score. For example, the last call entry in the call queue 901 is displayed having a score of 100. The calls in the call queue 901 may also be color-coded to represent the type of emergency, or type of alarm to which they are correlated. Alternatively, correlated events may still have all individual events shown on the GUI 143, with a special color code or icon indicator to show that the event is correlated to other events in the queues.

Alternative to color-coded, an icon may be displayed next to the entries within the call queue 901 and the alarm queue 903 that indicate the emergency type. For example, a fire symbol may be displayed for a fire emergency, a medical cross may be displayed for a medical emergency situation, and a police badge may be displayed for a police emergency or crime in progress.

Figure 10:
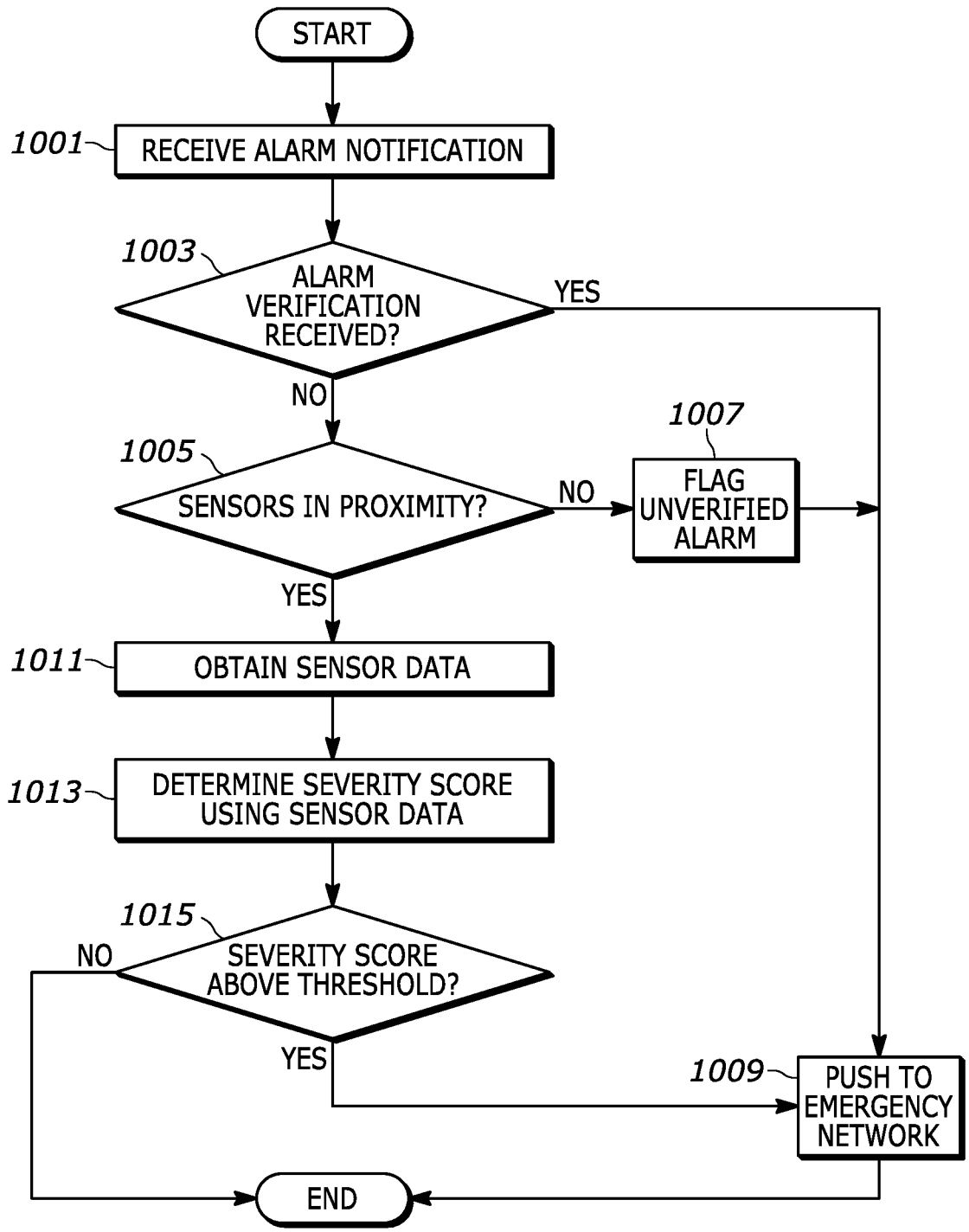
FIG. 10 is a flowchart showing a method of operation of false alarm detection logic in an emergency data manager in accordance with various embodiments.

FIG. 10 is a flowchart showing a method of operation of the false alarm detection logic 210 in accordance with various embodiments. The method of operation begins, and in operation block 1001, the false alarm detection logic 210 receives an alarm notification. The alarm notification may be prioritized alarm data 213 or may be non-prioritized alarm data 215. Therefore, in decision block 1003, the false alarm detection logic 210 checks whether an alarm verification was received from one of the screener networks 207. If yes, then the method of operation proceeds to operation block 1009 and pushes the alarm data to the emergency network. However, if an alarm verification has not been received at decision block 1003, then the method of operation proceeds to decision block 1005 and the false alarm detection logic 210 checks whether there are any sensors and proximity to the location from which the alarm notification was received. If not, then the false alarm detection logic 210 flags the alarm as an unverified alarm in operation block 1007, and pushes the alarm data to the emergency network with the unverified alarm flag in operation block 1009. However, if sensor data is available at decision block 1005, then the method of operation proceeds to operation block 1011 and the false alarm detection logic 210 obtains sensor data from the sensors 197. In operation block 1013, the false alarm detection logic 210 determines a severity score using the sensor data. In decision block 1015, false alarm detection logic 210 may determine whether the severity score is above a threshold. If not, the method of operation terminates as shown. However, if the severity score is above a threshold at decision block 1015, then the false alarm detection logic 210 will push the alarm data to the emergency network in operation block 1009. In other words, the false alarm detection logic 210 will not push the alarm to the emergency network if it is determined that the alarm is a false alarm. The severity score, and the predetermined thresholds may be used to determine whether an alarm is false alarm or not.

Figure 11:
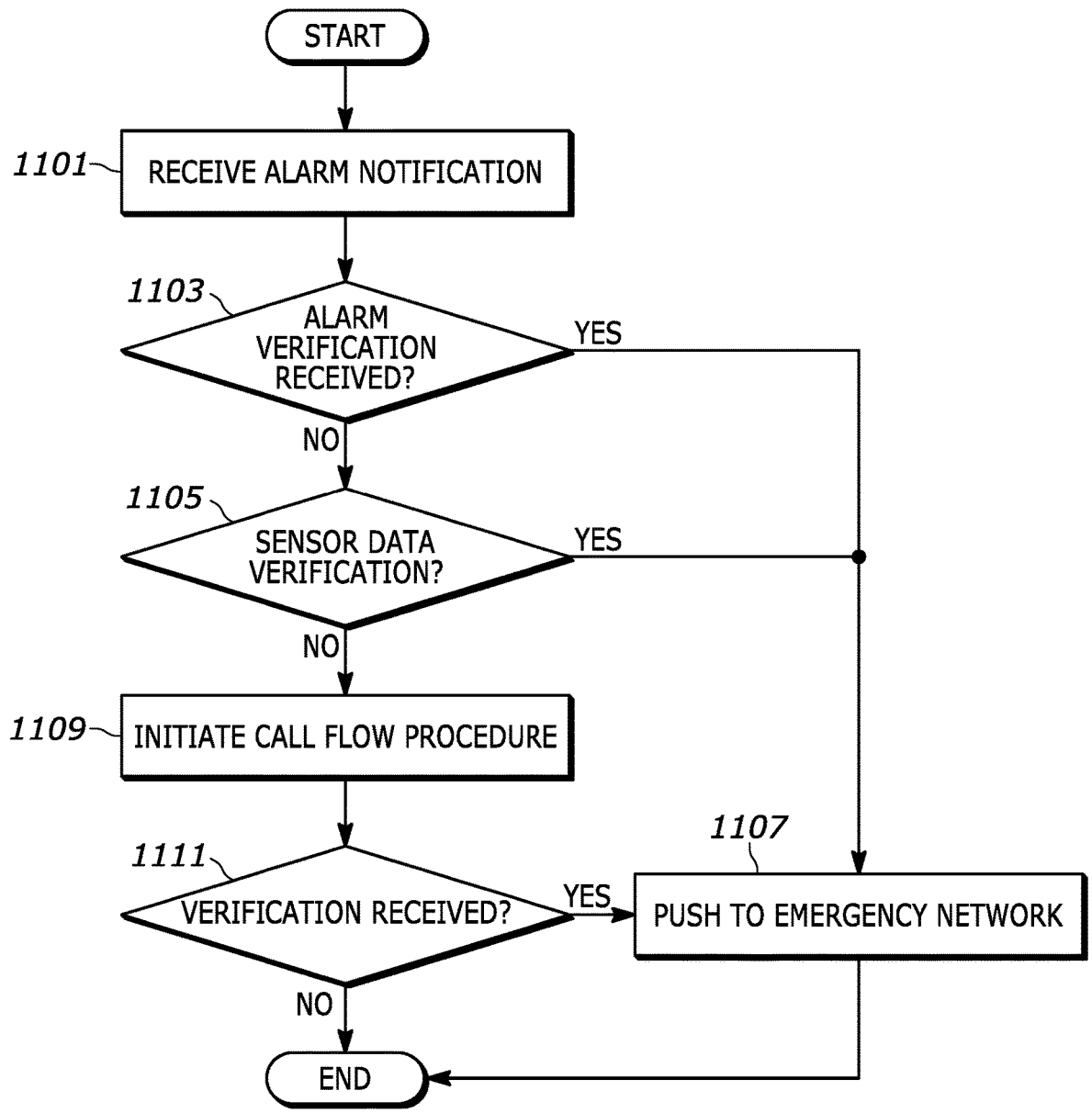
FIG. 11 is a flowchart showing a method of operation of false alarm detection logic in an emergency data manager in accordance with various embodiments.

FIG. 11 is a flowchart showing a method of operation of the false alarm detection logic 210 in accordance with various embodiments. The method of operation begins, and in operation block 1101, the false alarm detection logic 210 receives an alarm notification. At decision block 1103, the false alarm detection logic 210 determines whether an alarm verification has been received, for example from one of the screener networks 207. If yes then the method of operation proceeds to operation block 1107 and pushes the alarm data to the emergency network. The method of operation then terminates as shown. However, if no alarm verification was received at decision block 1103, then the false alarm detection logic 210 will check for sensor data verification in decision block 1105. If sensor verification data is obtained in decision block 1105, then the false alarm detection logic 210 will push the alarm data to the emergency network in operation block 1107. However, if no sensor verification data is obtained at decision block 1105, then the false alarm detection logic 210 may initiate a call flow procedure in operation block 1109. The call procedure may use an automated call (i.e. a robot call) to the keyholder related to the alarm and request verification by an input. If the verification is received at decision block 1111, then the alarm data is pushed to the emergency network in operation block 1107. However, if no verification is received at decision block 1111, then the method of operation terminates as shown and the alarm is not pushed to the emergency network because it is determined to be a false alarm.

Figure 12:
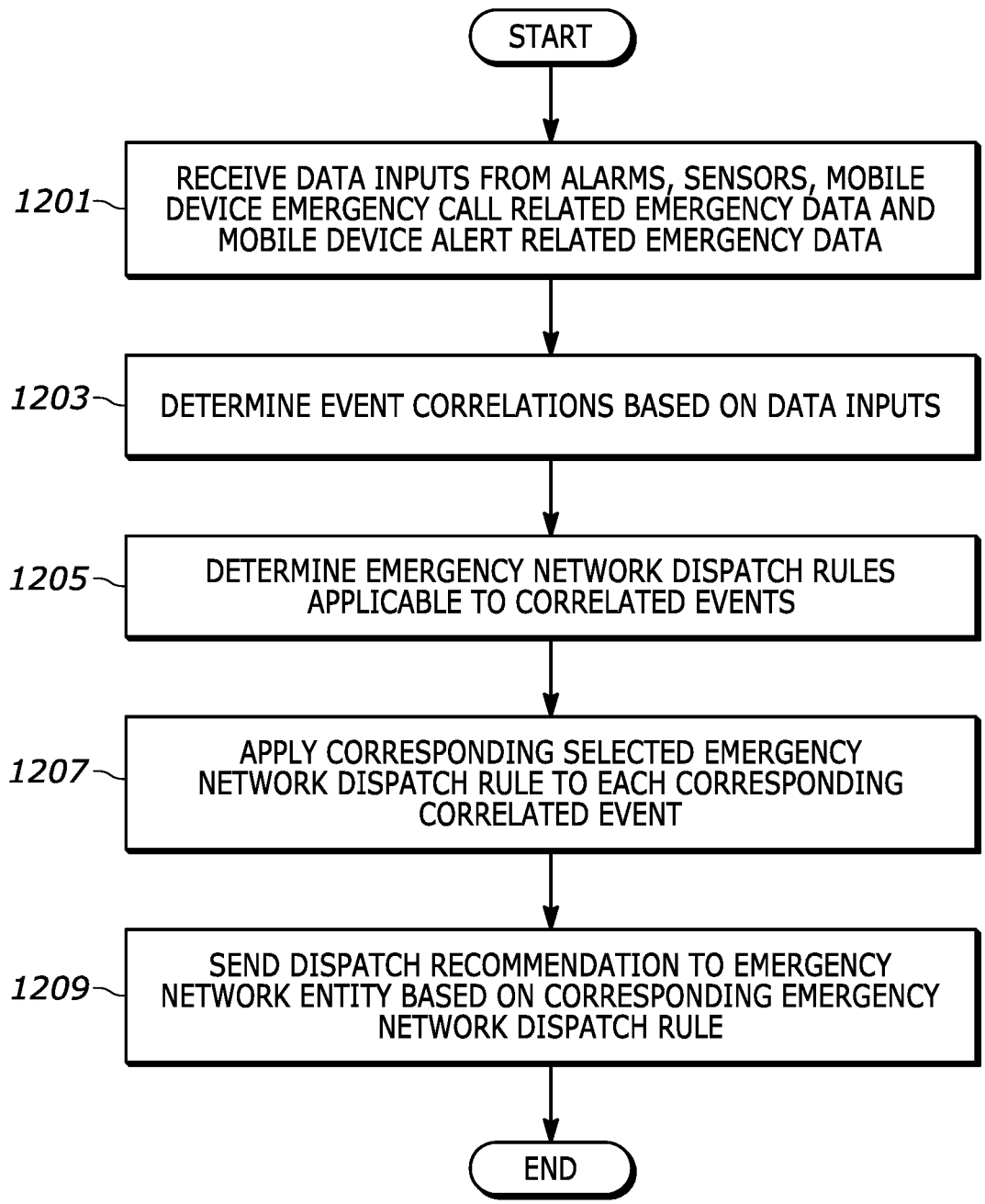
FIG. 12 is a flowchart showing a method of operation of event correlation logic in an emergency data manager in accordance with various embodiments.

FIG. 12 is a flowchart showing a method of operation of event correlation logic in accordance with various embodiments. The method of operation begins, and in operation block 1201 the event correlation logic 200 receives data inputs from alarms 196, sensors 197, and mobile device emergency call related data from the various databases 120, and mobile device alert related emergency data which may also be from databases 120. In operation block 1203, the event correlation logic 200 determines event correlations based on the data inputs. In operation block 1205, the event correlation logic 200 determines the emergency network dispatch rules applicable to correlated events based on the emergency types corresponding to the correlated events. For example, a fire emergency will have one specific set of dispatch rules, whereas a police emergency will have another set of dispatch rules that will be applicable. In some embodiments, such as the emergency data manager 100 embodiment illustrated in FIG. 3, the dispatch rules 337 stored in memory 330 are accessed by the event correlation logic and applied to the specific emergency type. Therefore, in operation block 1207 the event correlation logic 200 applies the corresponding selected emergency network dispatch rules to each corresponding correlated event. In operation block 1209, the event correlation logic 200 will send dispatch recommendations to an emergency network entity based on the corresponding emergency network dispatch rule. The method of operation then terminates as shown.

Figure 13:
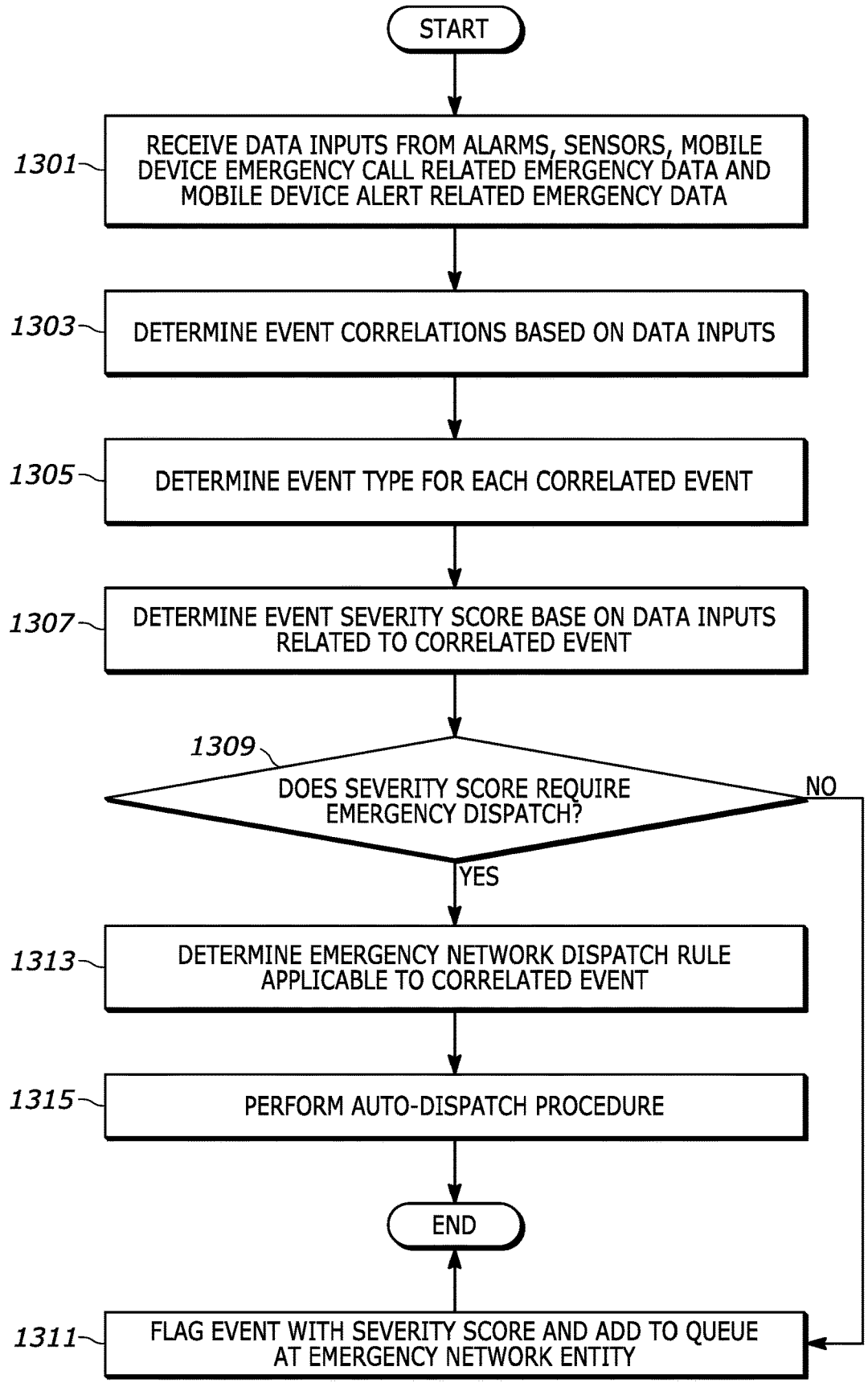
FIG. 13 is a flowchart showing a method of operation of event correlation logic in an emergency data manager in accordance with various embodiments.

FIG. 13 is a flowchart showing a method of operation of event correlation logic in accordance with various embodiments. The method of operation begins, and in operation block 1301 the event correlation logic 200 receives data inputs from alarms 196, sensors 197, mobile device emergency call related emergency data from the various databases 120 as well as mobile device alert related emergency data from the same databases. In operation block 1303, the event correlation logic 200 determines event correlations based on the data inputs. In operation block 1305, the event correlation logic 200 determines an event type for each correlated event, for example, fire emergency, medical emergency, police emergency, etc. In operation block 1307, event correlation logic 200 determines an event severity score based on the data inputs related to the correlated event and the event type. At decision block 1309, the event correlation logic 200 determines whether the severity score requires emergency dispatch. If not, then the method of operation proceeds to operation block 1311, and the event correlation logic 200 adds the emergency event with its corresponding severity score to the relevant queue at the relevant emergency network entity. The method of operation then terminates as shown.

However, if at decision block 1309 the severity score does require emergency dispatch, the method of operation proceeds to operation block 1313 and the event correlation logic 200 determines the emergency network dispatch rules applicable to the correlated event. In operation block 1315, the event correlation logic 200 performs an auto dispatch procedure. The method of operation then ends as shown.

The auto dispatch procedure may involve evaluating dispatch rules for the particular emergency type to see if all the criteria are met, or if the number of criteria are met such that the emergency requires dispatch.

Figure 14:
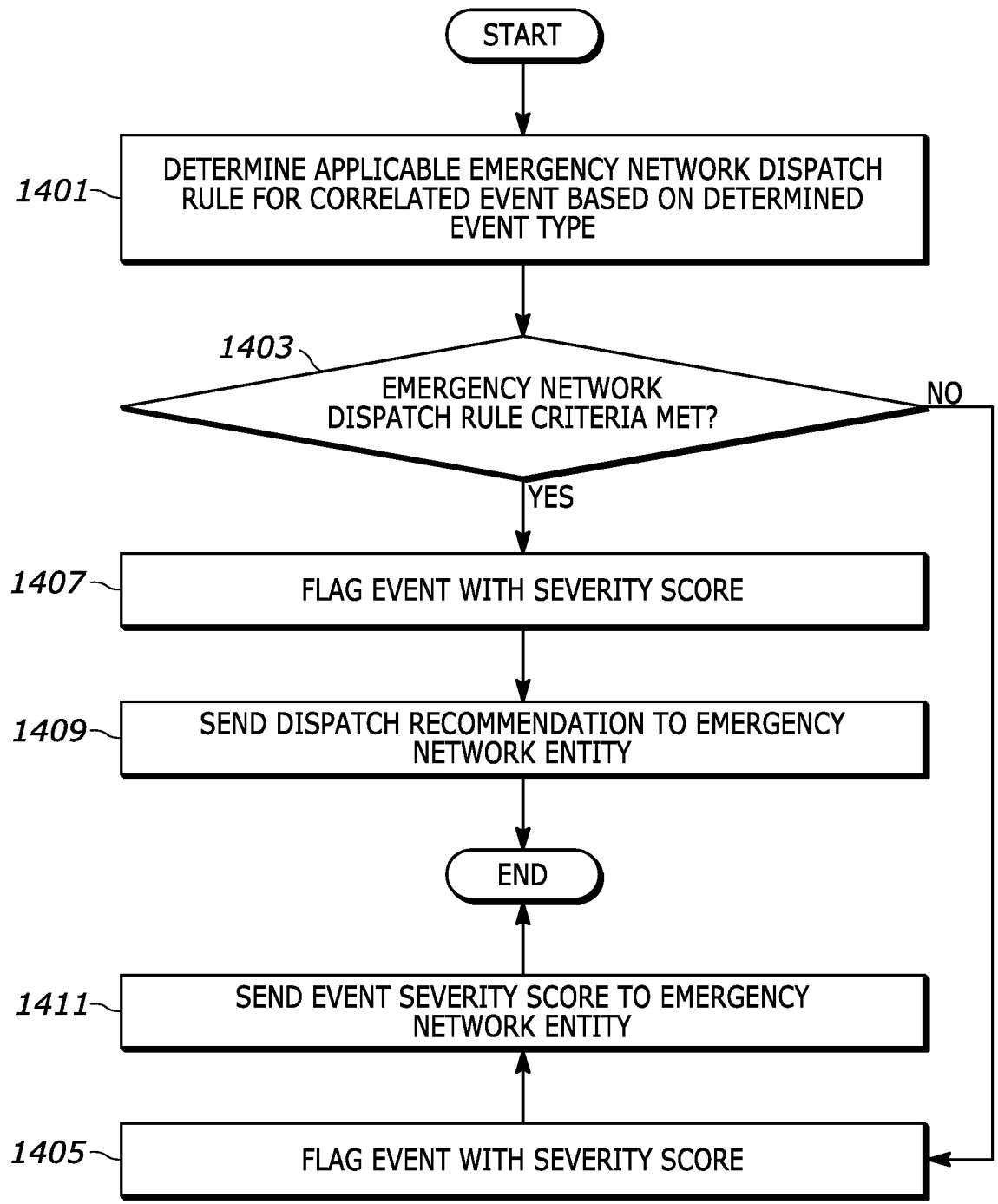
FIG. 14 is a flowchart showing a method of operation of event correlation logic in an emergency data manager in accordance with various embodiments.

FIG. 14 is a flowchart showing a method of operation of event correlation logic in accordance with various embodiments. The method of operation begins, and in operation block 1401 the event correlation logic 200 determines the applicable emergency network dispatch rules for correlated events based on determining the event types. In decision block 1403, the event correlation logic 200 determines whether the emergency network dispatch rules criteria has been met. If not, the method of operation proceeds to operation block 1405, and the event correlation logic 200 flags the event with a severity score. In operation block 1411, the event correlation logic 200 sends the event severity score to the appropriate emergency network entity and the method of operation terminates as shown.

If however, the emergency network dispatch rules criteria has been met at decision block 1403, then the event correlation logic 200 flags the event with the appropriate severity score in operation block 1407, and sends a dispatch recommendation to the appropriate emergency network entity in operation block 1409. The method of operation then terminates as shown.

Figure 15:
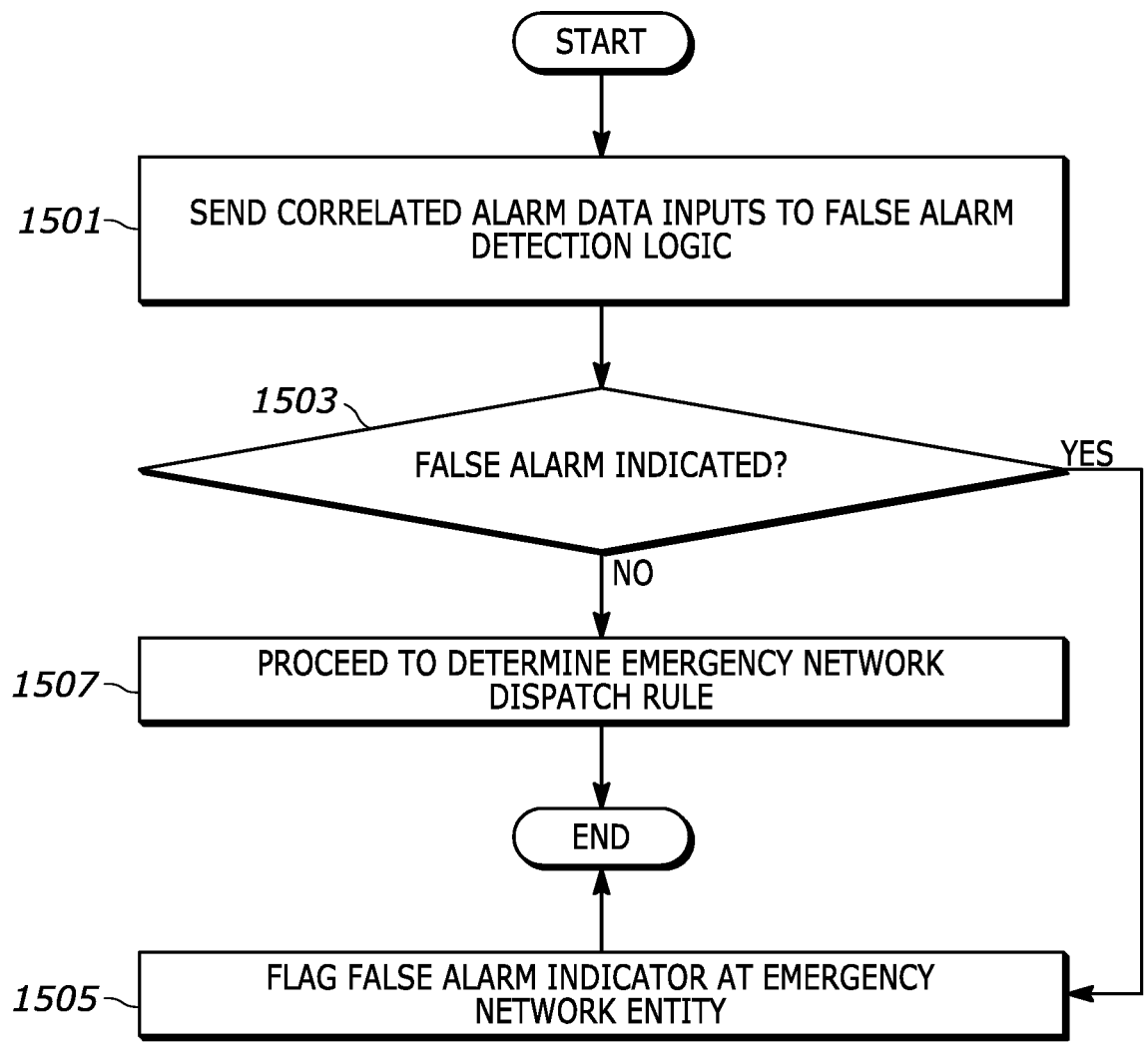
FIG. 15 is a flowchart showing a method of operation of event correlation logic and false alarm detection logic in an emergency data manager in accordance with various embodiments.

FIG. 15 is a flowchart showing a method of operation of event correlation logic and false alarm detection logic in accordance with various embodiments. The method of operation begins, and in operation block 1501, the event correlation logic 200 sends correlated alarm data inputs to the false alarm detection logic 210. In decision block 1503, the event correlation logic 200 determines whether false alarm has been indicated by the false alarm detection logic 210. If yes, the method of operation proceeds to operation block 1505 and the event correlation logic 200 flags the false alarm indicator at the emergency network entity. However, if at decision block 1503 no false alarm is indicated, then in operation block 1507 the event correlation logic 200 proceeds to determine the emergency network dispatch rule for the correlated event. The method of operation then ends as shown.

Emergency dispatch rules normally involve a set of criteria there are evaluated by a call taker, for example at a call handling workstation network entity in an emergency network. This procedure is performed manually by the call taker were dispatch operator usually by asking the caller, or other individuals on the scene, specific questions to obtain the needed information. In accordance with the embodiments, the emergency dispatch rules are automated and the determination of the answers to the questions normally ask verbally by a call taker are determined using sensor data or other data available from involved mobile devices, proximal sensors or databases. Therefore, the event correlation logic 200 makes a dispatch recommendation which is sent to the emergency response logic 144 operating within an emergency network entity 140. The emergency response logic 144 may be operative to perform the dispatch operation by contacting the appropriate emergency responders, such as the fire department ambulance or police department. The information related to the emergency type, and any related emergency data is conveyed to the emergency responders such that they may respond at the scene of the emergency accordingly. In some embodiments, the emergency data manager 100 is operative to communicate with emergency responder devices 150 via, for example the emergency data module 700 which is operative to form an IP connection with the emergency data manager 100. The emergency data manager 100 may send dispatch information that is displayed on the GUI 155 of the responder device 150. An emergency responder may accept the dispatch information using the GUI 155.

In some embodiments, the experience of the call taker is simulated by a machine learning algorithm that has been fed appropriate amounts of emergency data from alarms, emergency calls and sensors to form a training procedure that is used to train the event correlation logic 200 and the false alarm detection logic 210. In other words, in some embodiments the event correlation logic 200 and false alarm detection logic 210 are trained by machine learning algorithms subsequent to the machine learning algorithms evaluating appropriate amounts of emergency data and/or comparing actions of the machine learning algorithm with the actions of an experienced call taker and adjusting the algorithm accordingly. Thus, in some embodiments, the event correlation logic 200 and false alarm detection logic 210 are rule based logic systems that apply predetermined rules stored either within the logic components themselves, or within operatively coupled external memory. While in other embodiments, the event correlation logic 200 and false alarm detection logic 210 are trained via machine learning algorithms.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
  receiving data inputs for a plurality of events comprising alarms, sensors, and mobile device emergency call and emergency alert related emergency data comprising location data, sensor data and medical data;
  determining by event correlation logic, event correlations based on the data inputs to generate a set of correlated events, wherein the event correlation logic is trained using machine learning;
  determining emergency network dispatch rules for each correlated event based on event type, each dispatch rule comprising a set of criteria to be met prior to dispatching emergency responders;
  applying corresponding emergency network dispatch rules to each corresponding correlated event by determining whether a corresponding set of criteria defined by the corresponding emergency network dispatch rules are met;
  sending a dispatch recommendation to an emergency work entity for at least one correlated event in response to the corresponding set of criteria defined by the corresponding emergency network dispatch rules being met for the at least one correlated event; and dispatching emergency responders automatically by sending the dispatch recommendation to the emergency responders corresponding to the at least one correlated event.

2. The method of claim 1, further comprising:
determining the emergency network entity for each correlated event based on associations between the data inputs corresponding to each correlated event and each emergency network entity's geographic boundary.

3. The method of claim 1, wherein applying corresponding emergency network dispatch rules to each corresponding correlated event, comprises:
determining answers to a series of questions corresponding to the event type via a logic component trained using machine learning.

4. The method of claim 2, further comprising:
establishing a plurality of network connections with a plurality of emergency network entities; and
sending dispatch recommendations to each emergency network entity based on the associations between the data inputs corresponding to each correlated event and with each emergency network entity's geographic boundary.

5. The method of claim 1, wherein determining emergency network dispatch rules for each correlated event based on event type, comprises:
determining an event type for each correlated event as an event type selected from the group of: a fire emergency event, a police emergency event and a medical emergency event.

6. The method of claim 1, wherein determining emergency network dispatch rules for each correlated event based on event type, comprises:
determining that a correlated event includes a combination of at least two event types selected from the group of: a fire emergency event, a police emergency event and a medical emergency event.

7. The method of claim 6, further comprising:
sending a first dispatch recommendation related to a first event type to an emergency network entity for a correlated event; and
sending a second dispatch recommendation related to a second event type for the correlated event.

8. The method of claim 6, wherein sending a second dispatch recommendation related to a second event type for the correlated event, comprises:
sending the second dispatch recommendation related to the second event type to a second emergency network entity.

9. An apparatus comprising:
a network component, operative to connect to the Internet;
event correlation logic, operatively coupled to the network component, the event correlation logic operative to:
receive data inputs or a plurality of events comprising alarms, sensors, and mobile device emergency call and emergency alert related emergency data comprising location data, sensor data and medical data;
determine event correlations based on the data inputs to generate a set of correlated events, wherein the event correlation logic is trained to determine event correlations using machine learning;
determine emergency network dispatch rules for each correlated event based on event type, each dispatch rule comprising a set of criteria to be met prior to dispatching emergency responder;
apply corresponding emergency network dispatch rules to each corresponding correlated event by determining whether a corresponding set of criteria defined by the corresponding emergency network dispatch rules are met;
send a dispatch recommendation to an emergency network entity for at least one correlated event in response to the corresponding set of criteria defined by the corresponding emergency network dispatch rules being met for the at least one correlated event; and
dispatch emergency responders automatically by sending the dispatch recommendation to the emergency responders corresponding to the at least one correlated event.

10. The apparatus of claim 9, further comprising:
a geofence module, operatively coupled to the event correlation logic, the geofence module operative to:
determine the emergency network entity for each correlated event based on associations between the data inputs corresponding to each correlated event and each emergency network entity's geographic boundary.

11. The apparatus of claim 9, wherein the event correlation logic is trained to apply corresponding emergency network dispatch rules to each corresponding correlated event, by determining answers to a series of questions corresponding to the event type using machine learning.

12. The apparatus of claim 10, wherein the event correlation logic is further operative to:
establish a plurality of network connections with a plurality of emergency network entities; and
send dispatch recommendations to each emergency network entity based on the associations between the data inputs corresponding to each correlated event and with each emergency network entity's geographic boundary.

13. The apparatus of claim 9, wherein the event correlation logic is operative to determine emergency network dispatch rules for each correlated event based on event type, by determining an event type for each correlated event as an event type selected from the group of: a fire emergency event, a police emergency event and a medical emergency event.

14. The apparatus of claim 9, wherein the event correlation logic is operative to determine emergency network dispatch rules for each correlated event based on event type, by determining that a correlated event includes a combination of at least two event types selected from the group of: a fire emergency event, a police emergency event and a medical emergency event.

15. The apparatus of claim 14, wherein the event correlation logic is further operative to:
send a first dispatch recommendation related to a first event type to an emergency network entity for a correlated event; and
send a second dispatch recommendation related to a second event type for the correlated event.

16. The apparatus of claim 14, wherein the event correlation logic is operative to send a second dispatch recommendation related to a second event type for the correlated event, by sending the second dispatch recommendation related to the second event type to a second emergency network entity.

* * * * *